United States Patent
Seo et al.

(10) Patent No.: US 8,229,525 B2
(45) Date of Patent: Jul. 24, 2012

(54) SEMI-AUTOMATIC SLIDING DEVICE FOR A PORTABLE TERMINAL AND PORTABLE TERMINAL HAVING THE SAME

(75) Inventors: Jae-II Seo, Gumi-si (KR); Jae-Gab Lee, Gumi-si (KR); Byung-Yeol Ko, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 800 days.

(21) Appl. No.: 11/837,621

(22) Filed: Aug. 13, 2007

(65) Prior Publication Data

US 2008/0076493 A1    Mar. 27, 2008

(30) Foreign Application Priority Data

Sep. 26, 2006 (KR) .................. 10-2006-0093437
Nov. 27, 2006 (KR) .................. 10-2006-0117900

(51) Int. Cl.
*H04M 1/00* (2006.01)
(52) U.S. Cl. .................. 455/575.4; 455/575.1; 455/566; 455/575.3
(58) Field of Classification Search .............. 455/575.4, 455/575.1, 566, 575.3
See application file for complete search history.

(56) References Cited

U.S. PATENT DOCUMENTS

| 2005/0197173 | A1 | 9/2005 | Wee et al. | |
| 2006/0046796 | A1* | 3/2006 | Park et al. | 455/575.4 |
| 2006/0046797 | A1* | 3/2006 | Chen | 455/575.4 |
| 2007/0270107 | A1* | 11/2007 | Vanska et al. | 455/90.3 |

FOREIGN PATENT DOCUMENTS

| EP | 1 592 209 A2 | 11/2005 |
| EP | 1 631 043 A1 | 3/2006 |
| KR | 10-2004-0044213 A | 5/2004 |
| KR | 10-2005-0089257 A | 9/2005 |
| KR | 10-2006-0049059 A | 5/2006 |
| KR | 10-2006-0085886 A | 7/2006 |
| KR | 10-2006-0086524 A | 8/2006 |
| KR | 20-0423782 Y1 | 8/2006 |
| KR | 10-2007-0030413 A | 3/2007 |
| WO | 2005/034485 A2 | 4/2005 |
| WO | 2006/098590 A1 | 9/2006 |

OTHER PUBLICATIONS

Translation—Jeong KR 10-2006-0086524_pub.date Aug. 1, 2006. pdf.*

* cited by examiner

*Primary Examiner* — Charles Appiah
*Assistant Examiner* — Alexander Yi
(74) *Attorney, Agent, or Firm* — Jefferson IP Law, LLP

(57) ABSTRACT

A sliding-type portable communication terminal and a semi-automatic sliding device for the portable communication terminal are provided. The portable terminal has a body housing, a sliding housing sliding on the body housing, and a sliding device for semi-automatically moving the sliding housing with respect to the body housing. The sliding device includes a first member, a second member moving in a desired direction with respect to the first member while facing the first member, and an elastic body coupled between the first and second members. The elastic member functions as a semi-automatic driving source for driving the second member in the desired direction.

22 Claims, 24 Drawing Sheets

SEMI-AUTOMATIC SLIDING DEVICE FOR A PORTABLE TERMINAL AND PORTABLE TERMINAL HAVING THE SAME

PRIORITY

This application claims the benefit under 35 U.S.C. §119 (a) of Korean patent applications filed in the Korean Industrial Property Office on Sep. 26, 2006 and Nov. 27, 2006 and assigned Serial Nos. 2006-93437 and 2006-117900, respectively, the entire disclosures of which are hereby incorporated by reference.

BACKGROUND OF THE INVENTION

1. Field of the Invention

The present invention relates to a portable communication terminal, such as a DMB phone, a game phone, a chatting phone, a camera phone, an MP3 phone, a cellular phone, a PCS, a Personal Digital Assistant (PDA), a Hand Held Phone (HHP), and the like. More particularly, the present invention relates to a semi-automatic sliding device for a portable communication terminal and a portable communication terminal having the same.

2. Description of the Related Art

A portable communication terminal is an electronic device that a user can carry to perform wireless communication with another user. Examples of wireless communication include functions such as voice communication, message sending, file sending, image communication, camera functions and the like. Additionally, a portable communication terminal can serve as a personal secretary that manages telephone numbers personal schedules, and the like.

In consideration of portability, portable terminals have been designed to be compact, slim, easy to hold and light. Furthermore, portable terminals have been designed to provide multimedia capabilities to allow a user to pursue a wide variety of functions. For example, entertainment content including games and other forms of entertainment are an important function of portable communication terminals. In the future, it is expected that portable communication terminals will continue to be complicated devices having multiple functions, including image communication, games, Internet access, a camera, as well as simple voice communication.

Conventional portable terminals may be classified into various types according to their appearance, such as bar-type portable terminals and folder-type portable terminals. A bar-type portable communication terminal has a single housing shaped like a bar on which an input/output unit, an antenna unit, a transmitter/receiver, and the like are mounted. A folder-type portable terminal has a folder connected to a bar-type single housing by a hinge device in such a manner that the folder can be rotated to fold on or unfold from the housing.

Portable communication terminals may also be classified as rotatable-type communication terminals or sliding-type communication terminals according to the method of opening and closing the terminals. In a rotatable-type communication terminal, two housings are coupled to each other in a manner that one housing rotates to open or close the other housing while the housings face each other. In a sliding-type communication terminal, two housings are coupled to each other in a manner that one housing slides to open or close the other housing.

In a sliding-type portable communication terminal, one housing (the sliding housing) is coupled to another housing (the body housing) by a sliding unit. To couple the sliding housing to the body housing, a sliding device is mounted between the sliding housing and the body housing.

An example of a sliding device that allows a sliding housing to slide in one direction with respect to the body housing (that is, a one-directional sliding device) is disclosed in Korean Patent Application No. 2002-71911, which is assigned to the assignee of the present invention.

It is difficult to make the sliding device disclosed in Korean Patent Application No. 2002-71911 slim and it requires many assembly components, thereby increasing manufacturing costs. Further, the number of manufacturing processes is increased due to the increase of the number of parts. In addition, the weight of the portable terminal is increased due to the increase in the number of parts, thereby degrading portability of the portable terminal.

An example of a sliding device that allows a sliding housing to slide in two directions with respect to the body housing (that is, a two-directional sliding device) is disclosed in Korean Patent Application No. 2005-70904, which is assigned to the assignee of the present applicant.

The sliding device disclosed in Korean Patent Application No. 2005-70904 has many of the same drawbacks as the previously discussed device. For example, it is also difficult to make slim and requires many assembly components, thereby increasing manufacturing costs, the number of manufacturing processes, and the weight of the portable terminal.

SUMMARY OF THE INVENTION

An aspect of the present invention is to address at least the above problems and/or disadvantages and to provide at least the advantages described below. Accordingly, an aspect of the present invention is to provide a semi-automatic sliding device and a sliding-type portable communication terminal having the same, which is advantageous for slimness and lightness of the portable terminal.

Another aspect of the present invention is to provide a semi-automatic sliding device and a sliding-type portable communication terminal having the same in which the number of parts and assembly processes can be reduced, thereby making it possible to reduce manufacturing costs.

A further aspect of the present invention is to provide a semi-automatic sliding device and a sliding-type portable communication terminal having the same which have a reduced number of parts, thereby reducing the weight of the portable terminal.

Still another aspect of the present invention is to provide a semi-automatic sliding device and a sliding-type portable communication terminal having the same in which a closed-loop shaped elastic body can be used as a semi-automatic driving source, thereby reducing the thickness of the portable terminal.

In accordance with an aspect of the present invention, a semi-automatic sliding device of a sliding-type portable communication terminal including a body housing and a sliding housing sliding on the body housing in a longitudinal direction is provided. The semi-automatic sliding device includes a first member, a second member alternatively moving in a transverse or longitudinal direction of the first member while facing the first member, and an elastic body coupled to the first and second members and disposed between the first and second members. The elastic body functions as a semi-automatic driving source for driving the second member in the transverse or longitudinal directions.

In accordance with another aspect of the present invention, a semi-automatic sliding device of a sliding-type portable communication terminal including a body housing and a sliding housing sliding on the body housing in a longitudinal direction is provided. The semi-automatic sliding device includes a first member, a second member, coupling means for restricting the second member so that the second member moves while facing the first member, guide means for guiding the movement of the second member in a transverse or longitudinal direction of the first member, and an elastic body coupled to the first and second members and functioning as a semi-automatic driving source for driving the second member.

In accordance with still another aspect of the present invention, a semi-automatic sliding device of a sliding-type portable communication terminal including a body housing and a sliding housing sliding on the body housing is provided. The semi-automatic sliding device includes a first member, a second member, coupling means for restricting the second member so that the second member moves while facing the first member, guide means for guiding the movement of the second member on the first member in a predetermined direction, and an elastic body coupled to the first and second members. The elastic body supplies a driving force to move the second member to an initial position when the second member moves by a distance shorter than a predetermined distance, and supplies driving force to move the second member to a termination position when the second member moves further than the predetermined distance.

In accordance with still another aspect of the present invention, a sliding-type portable communication terminal is provided. The portable terminal includes a body housing having a plurality of keys on an upper surface of the body housing, a sliding housing having a display unit mounted on an upper surface of the sliding housing and sliding on the body housing in a longitudinal, first transverse, or second transverse direction, so as to open and close a desired region on the upper surface of the body housing, and a three-directional sliding device for connecting the sliding housing to the body housing. The keys include first keys opened after the sliding housing moves in the longitudinal and first transverse direction, second keys opened as the sliding housing slides, and third keys opened as the sliding housing moves in the first and second transverse directions.

In accordance with still another aspect of the present invention, a semi-automatic sliding device of a sliding-type portable communication terminal including a body housing and a sliding housing sliding on the body housing is provided. The semi-automatic sliding device includes a first member, a second member, coupling means for restricting the second member so that the second member moves while facing the first member, guide means for guiding the movement of the second member in a first transverse direction substantially perpendicular to a longitudinal direction, or a second transverse direction substantially parallel with the first transverse direction and substantially perpendicular to the longitudinal direction, and an elastic body coupled to the first and second members and functioning as a semi-automatic driving source for the sliding movement of the second member.

In accordance with still another aspect of the present invention, a semi-automatic sliding device of a sliding-type portable communication terminal including a body housing and a sliding housing sliding on the body housing is provided. The semi-automatic sliding device includes a first member, a second member, coupling means for restricting the second member so that the second member moves while facing the first member, guide means for guiding the movement of the second member in a first longitudinal direction, a second longitudinal direction substantially parallel with the first longitudinal direction, a first transverse direction substantially perpendicular to the first longitudinal direction, or a second transverse direction substantially perpendicular to the first longitudinal direction and substantially parallel with the first transverse direction of the first member, and an elastic body coupled to the first and second members and functioning as a semi-automatic driving source for the sliding movement of the second member.

In accordance with still another aspect of the present invention, a sliding-type portable communication terminal including a body housing and a sliding housing sliding on the body housing to open and close the upper surface of the body housing while facing the body housing is provided. The body housing includes an upper surface and the sliding housing includes a bottom surface. The portable terminal includes guide means for guiding the movement of the sliding housing on the upper surface of the body housing in a transverse or longitudinal direction. An elastic body having a closed loop shape is mounted between the bottom surface of the body housing and the upper surface of the sliding housing to function as a semi-automatic driving source for the sliding movement of the sliding housing.

In accordance with still another aspect of the present invention, a sliding-type portable communication terminal includes a body housing having a plurality of keys arranged on an upper surface of the body housing, a sliding housing having a display unit mounted on an upper surface of the sliding housing and sliding on the body housing in a diagonal direction to open and close a desired region on the upper surface of the body housing while facing the body housing, and a sliding device for connecting the sliding housing to the body housing. The desired region of the body housing includes a first region extending in the transverse direction of the body housing and a second region extending in the longitudinal direction of the body housing.

BRIEF DESCRIPTION OF THE DRAWINGS

The above and other aspects, features and advantages of the present invention will be more apparent from the following detailed description of certain exemplary embodiments taken in conjunction with the accompanying drawings, in which.

DETAILED DESCRIPTION OF EXEMPLARY EMBODIMENTS

The following description with reference to the accompanying drawings is provided to assist in a comprehensive understanding of the exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
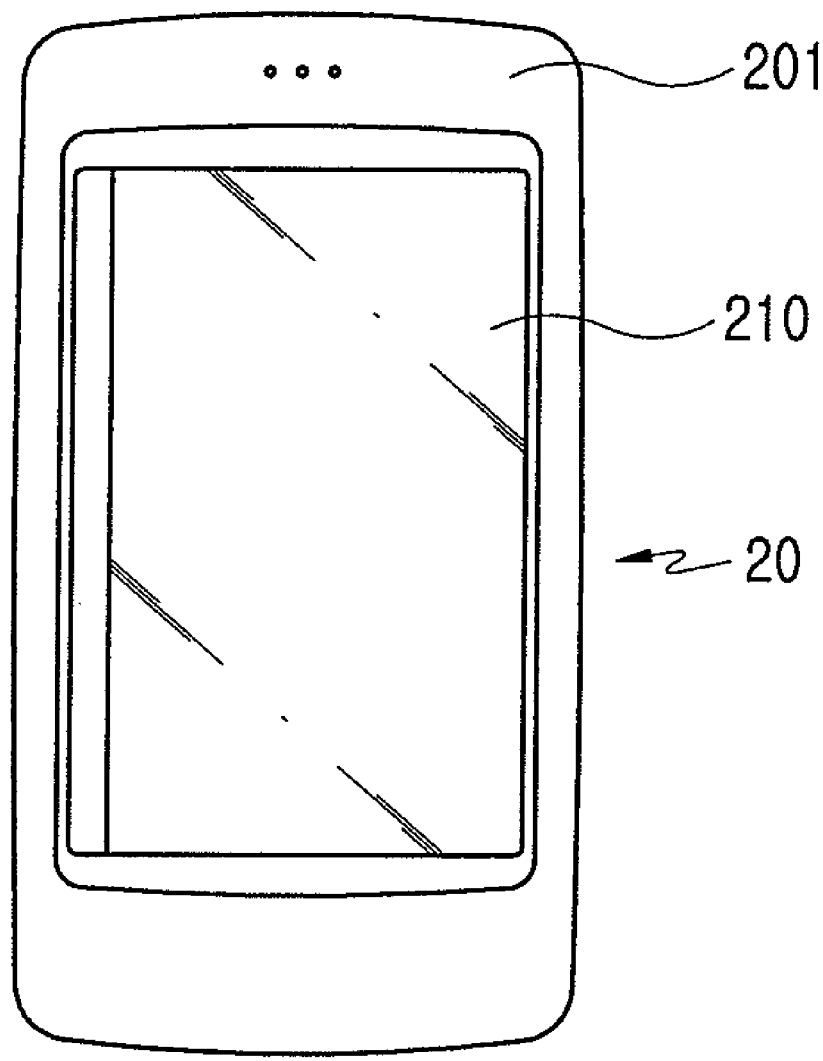
FIG. 1 is a front view illustrating a portable communication terminal employing a two-directional and semi-automatic sliding device according to an exemplary embodiment of the present invention.
Figure 2:
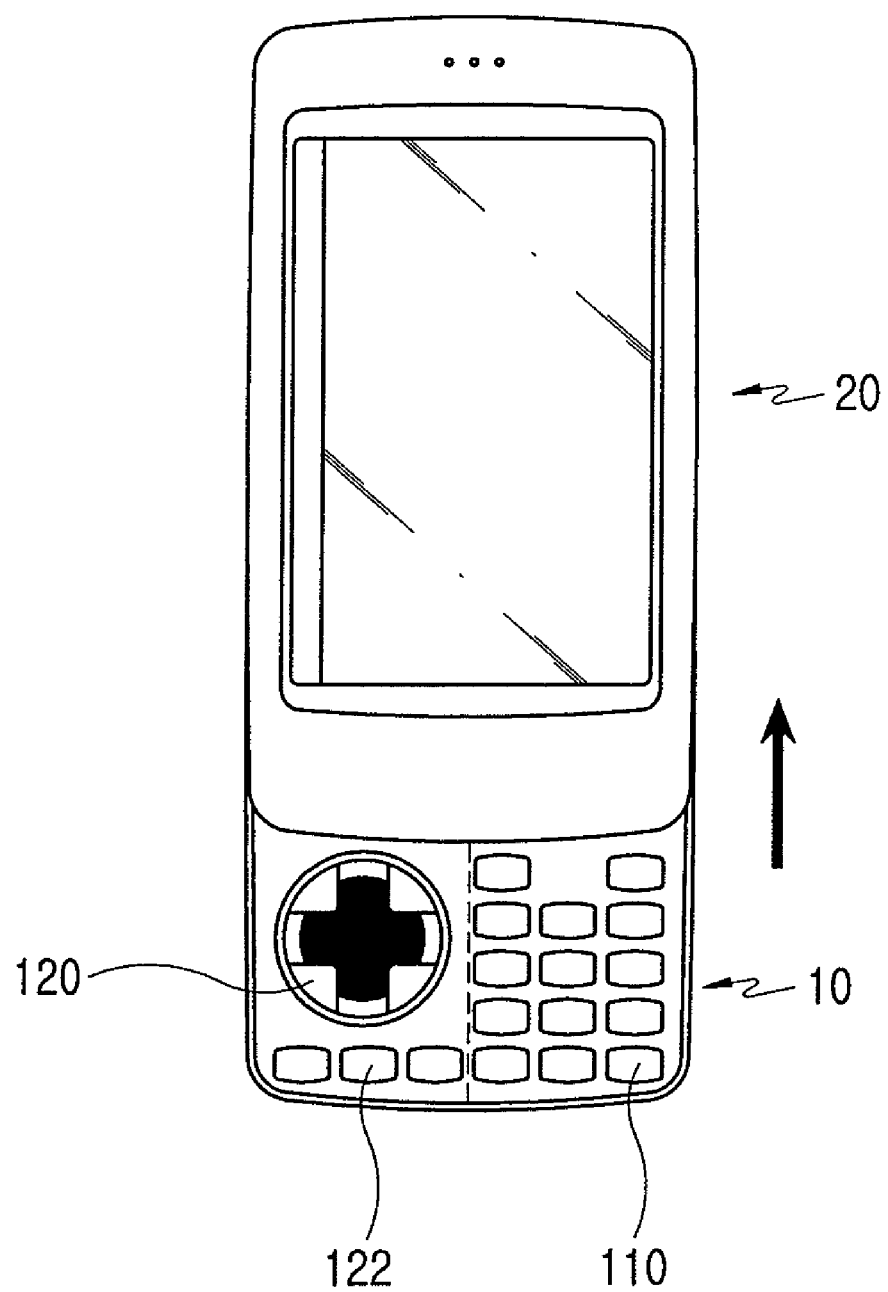
FIG. 2 is a front view illustrating the portable communication terminal illustrated in FIG. 1 with the sliding housing moved longitudinally.
Figure 3:
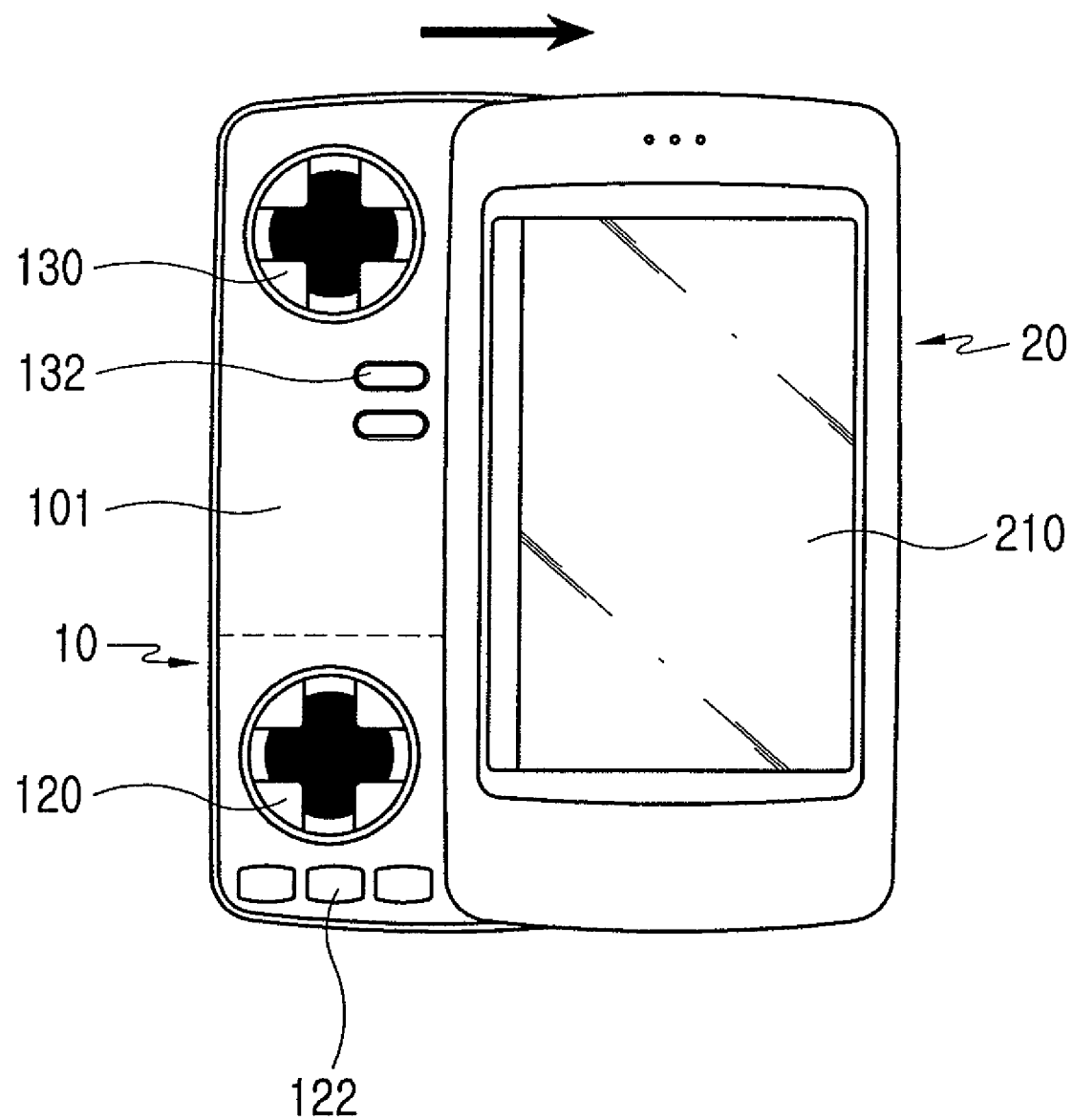
FIG. 3 is a front view illustrating the portable communication terminal illustrated in FIG. 1 with the sliding housing moved transversely.

Referring to FIGS. 1 to 3, a sliding-type portable communication terminal employing a semi-automatic sliding device according to an exemplary embodiment of the present invention includes a body housing 10, a sliding housing 20, and a semi-automatic sliding device 30 (see FIG. 4) for moving the body housing 10 with respect to the sliding housing 20.

The sliding housing 20 slides on the body housing 10 longitudinally or transversely. In FIG. 2, the sliding housing 20 is moved longitudinally, and in FIG. 3 the sliding housing 20 is moved transversely.

The body housing 10 has a plurality of keys on an upper surface 101 of the body housing 10. The keys include first keys 110 opened after the sliding housing 20 moves longitudinally, second keys 120 and 122 opened when the sliding housing 20 moves longitudinally or transversely, and third keys 130 and 132 opened when the sliding housing 20 moves transversely. A display unit 210 is mounted on the upper surface 201 of the sliding housing 20. The longitudinal direction is substantially perpendicular to the transverse direction.

The configuration of the two-directional and semi-automatic sliding device 30 will be described with reference to FIGS. 4 to 6E. The semi-automatic sliding device 30 according to an exemplary embodiment of the present invention includes first and second members 310 and 320 having a plate shape, and an elastic body 350 disposed between the first and second members 310 and 320 for driving the second member 320 semi-automatically. The first member 310 may be coupled to the upper surface of the body housing by a coupling member, or the upper surface of the body housing may function as the first member 310. Further, the second member 320 may be coupled to the bottom surface of the sliding housing, or the bottom surface of the sliding housing may function as the second member 320. If the upper surface of the body housing and the bottom surface of the sliding housing function as the first and second members 310 and 320, respectively, it is easier to make the portable communication terminal slimmer.

The second member 320 alternatively moves in a longitudinal or transverse direction of the first member 310 while facing the first member 310.

The elastic body 350 is used as a semi-automatic driving source for driving the second member 320. The semi-automatic driving source applies force to the first member 310 so as to return the first member 310 to an initial position when the first member 310 moves by a distance shorter than a predetermined distance, while applying force to the first member so as to move the first member to an opened position when the first member moves by a distance longer than the predetermined distance. The initial position refers to the closed state of the portable communication terminal, as illustrated in FIG. 1. The opened position refers to the opened state of the portable communication terminal, as shown in FIG. 2.

Figure 4:
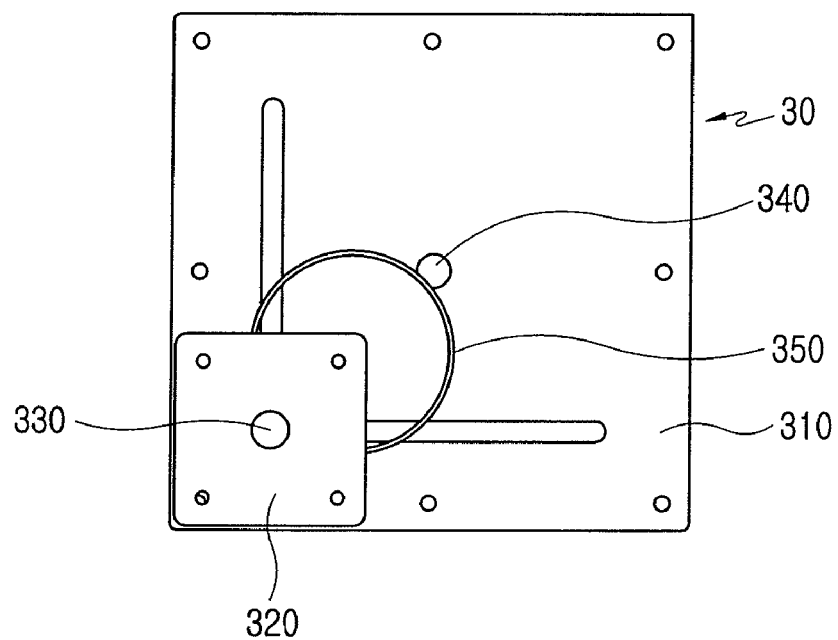
FIG. 4 is a front view illustrating the two-directional and semi-automatic sliding device of the portable terminal illustrated in FIG. 1.
Figure 5:
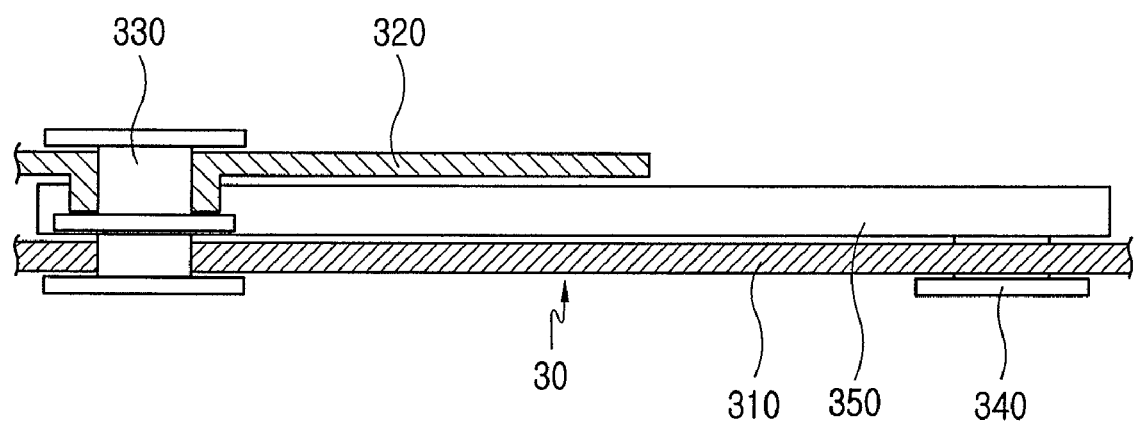
FIG. 5 is a sectional view illustrating the two-directional and semi-automatic sliding device illustrated in FIG. 4.
Figure 6A:
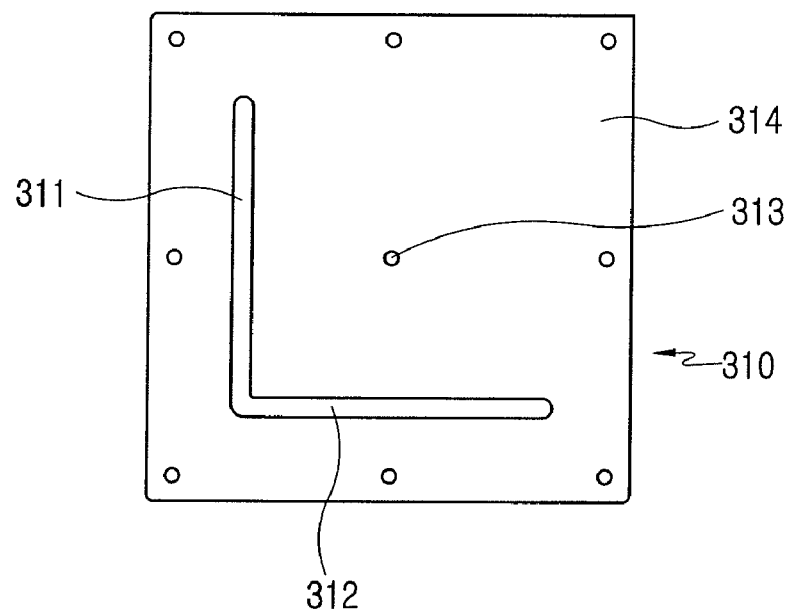
FIG. 6A is a front view illustrating the first member of the two-directional and semi-automatic sliding device illustrated in FIG. 4.
Figure 6B:
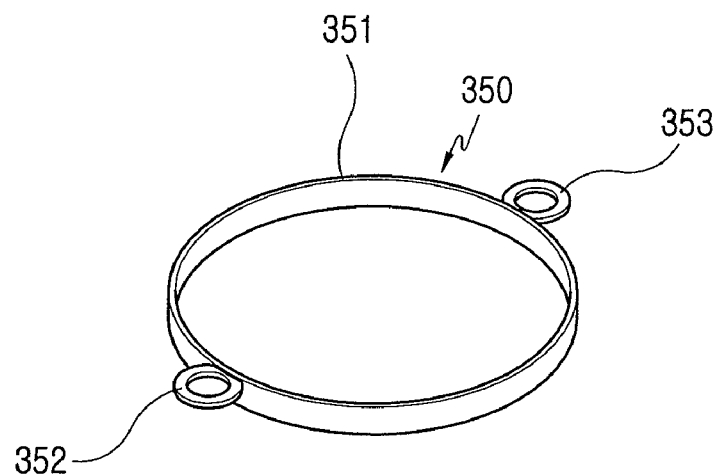
FIG. 6B is a perspective view illustrating the elastic body of the two-directional and semi-automatic sliding device illustrated in FIG. 4.

The configuration of the elastic body 350 according to an exemplary embodiment of the present invention will be described with reference to FIGS. 4 and 6B. The elastic body 350 includes a fixed end 353 rotatably connected to the first member 310, a movable end 352 rotatably connected to the second member 320 and moving along with the second member 320 in a transverse or longitudinal direction of the first member 310, and an elastic member 351 disposed between the fixed end 353 and the movable end 352 for applying driving force to the second member 320 so that the second member 320 is semi-automatically driven. The elastic member 351 may be formed as a closed-loop like a ring.

However, the shape of the elastic member 351 is not limited to a ring. If the elastic member 351 is formed as a closed-loop and functions as the semi-automatic driving source, the elastic member 351 may have any shape. The fixed end 353 and the movable end 352 may be generally symmetrically arranged around the elastic member 351. Further, the fixed end 353, the movable end 352 and the elastic member 351 may be integrally formed, particularly, they may be integrally molded.

The coupling members 330 and 340, which restrict the first and second members 310 and 320 while the first member 310 faces the second member 320, will now be described with reference to FIGS. 4, 6D and 6E. The coupling means includes a fixed coupling member 340 for rotatably coupling the fixed end 353 of the elastic body, and a movable coupling member 330 for rotatably coupling the movable end 352 of the elastic body. Specifically, the fixed end 353 of the elastic body 350 is rotatably connected to the first member 310 by the fixed coupling member 340 and the movable end 352 is rotatably connected to the second member 320 by the movable coupling member 330 so that it moves along with the second member 320 in a transverse or longitudinal direction of the first member 310.

The fixed end 353 is connected to the first member 310 by the fixed coupling member 340. Preferably, the fixed coupling member is a fixing rivet. The movable end 352 is connected to the second member 320 by the movable coupling member 330. Preferably, the movable coupling member 330 is a movable rivet.

Figure 6C:
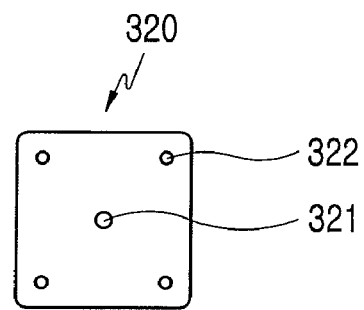
FIG. 6C is a front view illustrating the second member of the two-directional and semi-automatic sliding device illustrated in FIG. 4.
Figure 6D:
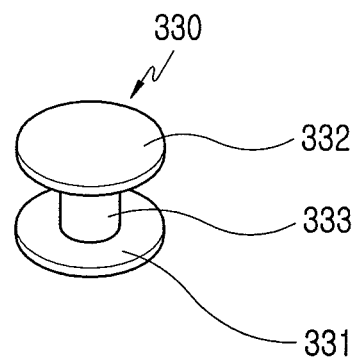
FIG. 6D is a perspective view illustrating a movable coupling of the two-directional and semi-automatic sliding device illustrated in FIG. 4.
Figure 6E:
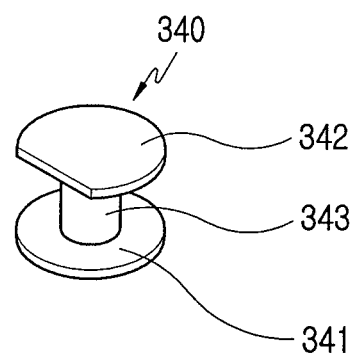
FIG. 6E is a perspective view illustrating a fixed coupling of the two-directional and semi-automatic sliding device illustrated in FIG. 4.

As illustrated in FIG. 6E, the fixed coupling member 340 includes a connector 343, a head portion 342 formed at the upper end of the connector 343, and a bottom portion 341 formed at the lower end of the connector 343. The diameters of the head portion 342 and the bottom portion 341 are greater than that of the connector 343.

As illustrated in FIG. 6D, the movable coupling member 330 includes a connector 333, a head portion 332 formed at the upper end of the connector 333, and a bottom portion 331 formed at the lower end of the connector 333. The diameters of the head portion 332 and the bottom portion 331 are greater than that of the connector 333.

The configuration of a guide member for guiding the sliding movement, particularly, the transverse or longitudinal movement of the second member 320 of the sliding device according to an exemplary embodiment of the present invention, will be described with reference to FIGS. 4 and 6A. The guide member is an element used for guiding the movement direction of the second member 320, and has a slot shape.

The guide-slot members 311 and 312 are pathways for the movable end 352 of the elastic body. That is, the movable coupling member 330 is mounted in and moves along the guide-slot members 311 and 312. The guide-slot members 311 and 312 include the first guide opening 311 formed in the longitudinal direction of the first member 310 and the second guide opening 312 formed in the transverse direction of the first member 310. The second guide opening 312 communicates with the first guide opening 311. The first and second guide openings 311 and 312 have an 'L' shape. In addition, the first member 310 has an opening 313 formed at the center thereof in which the fixed coupling member 340 is inserted, and a plurality of coupling holes 314 formed along an edge thereof, through which the first member 310 is coupled to the body housing. The first guide opening 311 is substantially perpendicular to the second guide opening 312.

As illustrated in FIG. 6C, the second member 320 has an opening 321 formed at the center thereof in which the movable coupling member 330 is inserted, and a plurality of coupling holes 322 formed at the corners thereof through which the second member 320 is coupled to the sliding housing.

Referring to FIG. 6A again, the movement direction of the second member 320 is determined by the shapes of the first and second guide openings 311 and 312. In the presently described exemplary embodiment of the present invention, the first and second guide openings 311 and 312 form an 'L' shape, but the present invention is not restricted to this particular shape. The first and second guide openings 311 and 312 may have various other shapes, for example, 'I', 'C', or 'D' shapes so that the sliding housing can slide in different manners. Different shapes will be described in further detail below.

The operation of the semi-automatic sliding device according to an exemplary embodiment of the present invention will be described with reference to FIGS. 7A to 7E. The sliding device of the portable communication terminal illustrated in FIG. 1 is in the state illustrated in FIG. 7A. The sliding device of the portable communication terminal illustrated in FIG. 2 is in the state illustrated in FIG. 7C. The sliding device of the portable communication terminal illustrated in FIG. 3 is in the state illustrated in FIG. 7E.

Figure 7A:
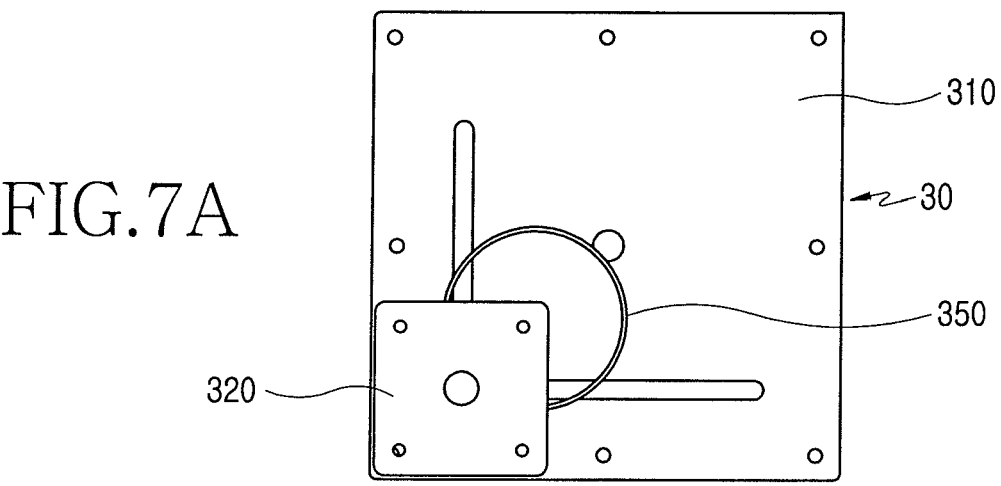
FIG. 7A to 7E are front views illustrating the operation of the two-directional and semi-automatic sliding device illustrated in FIG. 4.
Figure 7B:
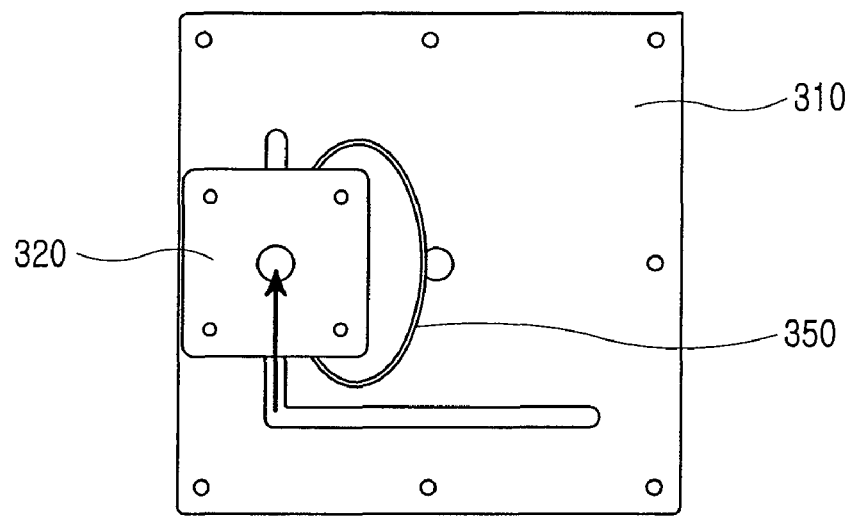
Figure 7C:
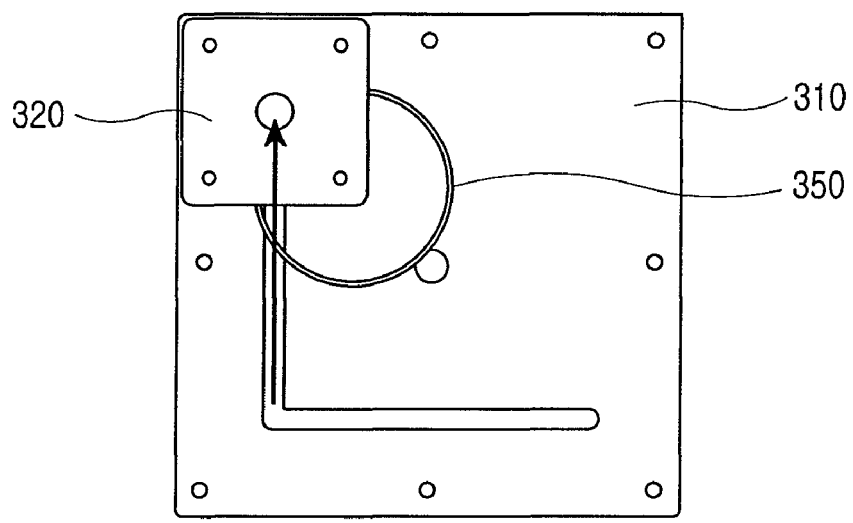

When a user pushes the sliding housing, i.e., the second member, in a longitudinal direction by a desired distance, the sliding housing moves from the position illustrated in FIG. 7A to the position illustrated in FIG. 7B. When the user continues to push the second member 320 in the longitudinal direction, the sliding housing is automatically moved to the position illustrated in FIG. 7C by the driving force of the elastic body 350. Thus, when the housing is moved a distance shorter than the desired distance, the user needs to apply force to the sliding housing to move the housing. When the housing is moved a distance longer than the desired distance, the elastic body 350 applies force to the sliding housing, thereby moving the housing.

Figure 7D:
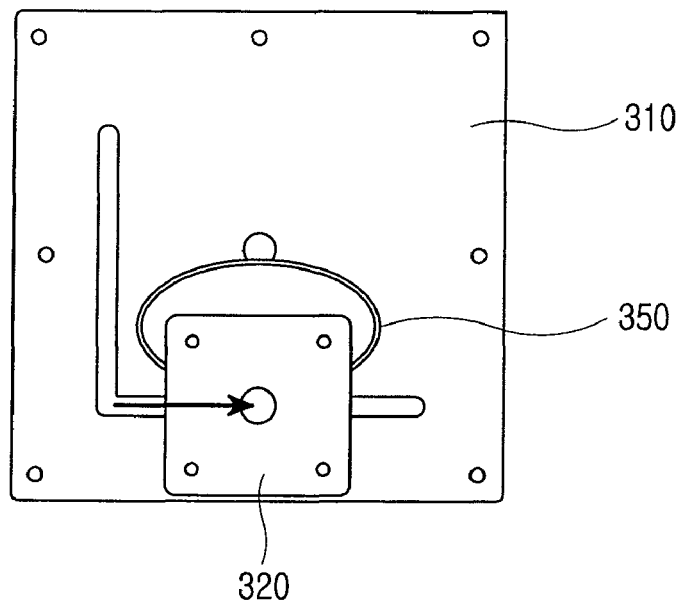
Figure 7E:
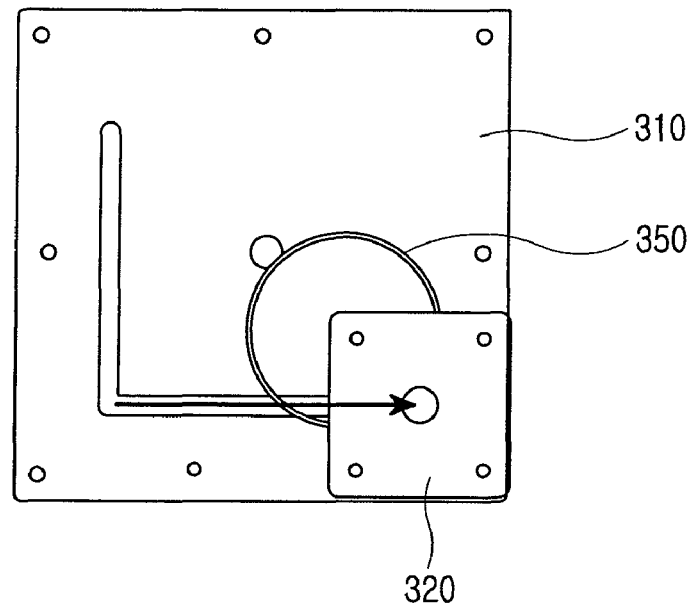

Similarly, when a user pushes the sliding housing, i.e., the second member, in a transverse direction by a desired distance, the sliding housing moves from the position illustrated in FIG. 7A to the position illustrated in FIG. 7D. When the user continues to push the second member 320 in the transverse direction, the sliding housing is automatically moved to the position illustrated in FIG. 7E by a restoring force of the elastic body 350.

Thus, when the second member 320 is alternatively moved in the transverse or longitudinal direction, the elastic body 350 functions as a semi-automatic driving source so that the user can semi-automatically open and close the portable communication terminal. During the movement of the second member 320, the elastic body 350 is deformed and has an elliptical shape. When the second member arrives at the positions illustrated in FIG. 7B or 7D, the elastic body 350 has the greatest elastic force. Further, when the second member 320 is located at the position illustrated in FIG. 7A, the movement of the second member 320 is restricted by the elastic body.

Figure 8:
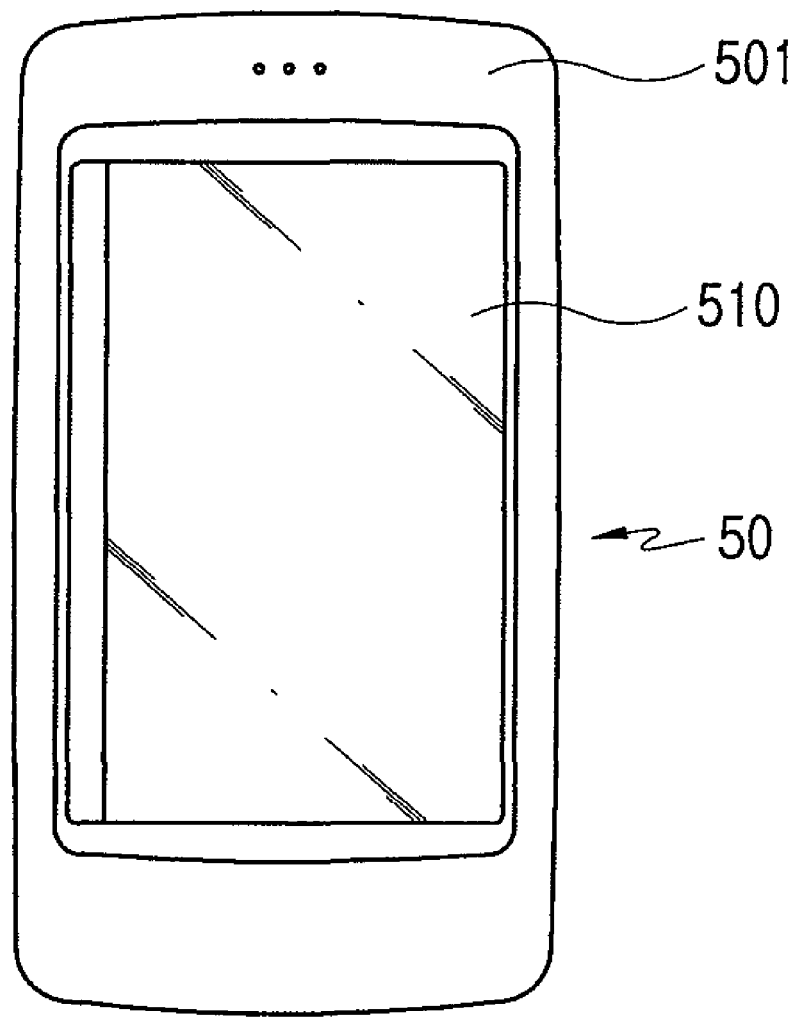
FIG. 8 is a front view illustrating a portable communication terminal employing a one-directional and semi-automatic sliding device according to an exemplary embodiment of the present invention.
Figure 9:
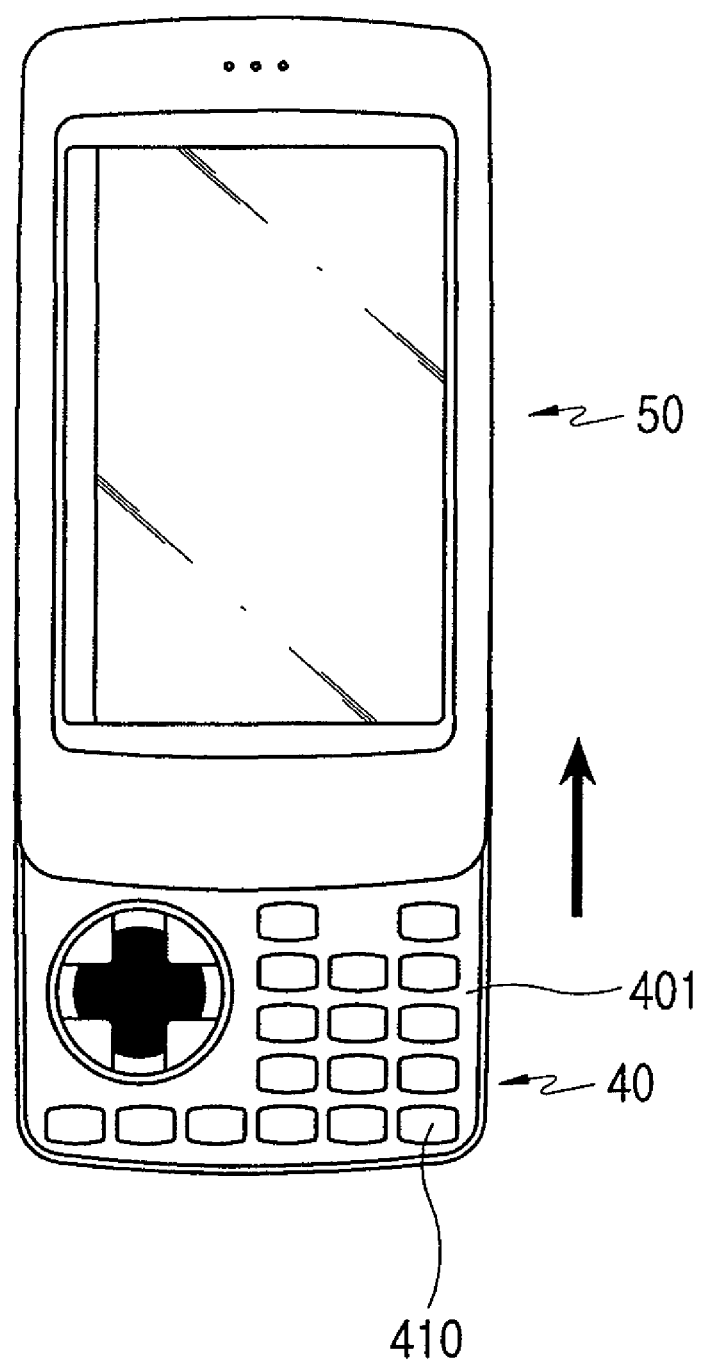
FIG. 9 is a front view illustrating the portable communication terminal illustrated in FIG. 8 with the sliding housing moved longitudinally.

The configuration of a one-directional and semi-automatic sliding device according to an exemplary embodiment of the present invention will now be described. As illustrated in FIGS. 8 and 9, a sliding-type portable communication terminal employing a one-directional semi-automatic sliding device includes a body housing 40, a sliding housing 50, and a semi-automatic sliding device 60 (see FIG. 10) for semi-automatically moving the sliding housing 50 in a longitudinal direction of the body housing. The semi-automatic sliding device 60 will be described in detail below.

The sliding housing 50 moves on the body housing 40 in the longitudinal direction. FIG. 9 illustrates the sliding housing 50 moved in the longitudinal direction.

The body housing 40 has a plurality of keys 410 on the upper surface 401 thereof, and the sliding housing 50 has a display unit 510 mounted on the upper surface 501 thereof. The keys 410 are exposed or covered according to the opening and closing of the sliding housing 50.

Figure 10:
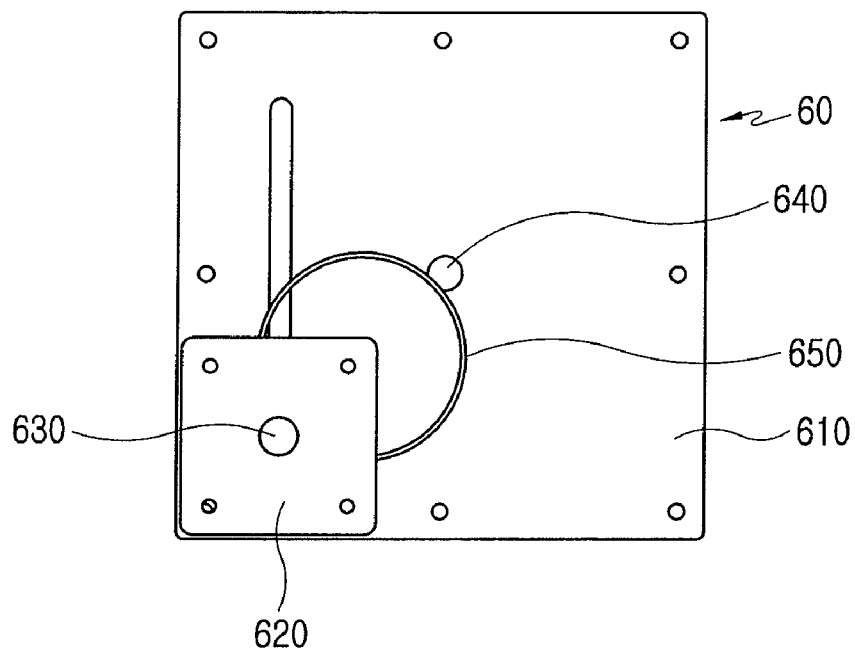
FIG. 10 is a front view illustrating the one-directional and semi-automatic sliding device of the portable terminal illustrated in FIG. 8.

The configuration of the one-directional semi-automatic sliding device 60 according to an exemplary embodiment of the present invention will be described with reference to FIGS. 10 and 11. The one-directional semi-automatic sliding device 60 has the same basic components as that of the two-directional semi-automatic sliding device 30 illustrated in FIGS. 4 to 7E, except for the shape of a guide opening 611 formed in the first member 610. Specifically, the one-directional semi-automatic sliding device has a second member 620, an elastic body 650, a movable coupling member 630, and a fixed coupling member 640 which are substantially the same as the corresponding components of the two-directional semi-automatic sliding device. Therefore, a description of these components will not be repeated.

The one-directional semi-automatic sliding device 60 includes first and second members 610 and 620 having a plate shape, and an elastic body 650 partially disposed between the first and second members 610 and 620 so as to provide a driving force to the second member 620. The first member 610 is coupled to the upper surface of the body housing by a coupling member, or the upper surface of the body housing may be used as the first member 610. Further, the second member 620 is coupled to the bottom surface of the sliding housing by a coupling member, or the bottom surface of the sliding housing may be used as the second member 620. If the upper surface of the body housing and the bottom surface of the sliding housing are used as the first and second members 610 and 620, respectively, it is easier to make the portable communication terminal slimmer.

In the illustrated embodiment, the second member 620 moves in the lengthwise direction of the first member 610, i.e., the longitudinal direction.

The elastic body 650 is used as a semi-automatic driving source for driving the second member 620. The semi-automatic driving source applies force to the first member 610 so as to return the first member 610 to an initial position when the first member 610 moves by a distance shorter than a predetermined distance, while applying force to the first member so as to move the first member to an opened position after the first member moves by a distance longer than the predetermined distance. The initial position refers to the closed state of the portable communication terminal, as illustrated in FIG. 8. The opened position refers to the opened state of the portable communication terminal, as illustrated in FIG. 9. The second member 620 is coupled to the first member 610 by the coupling member so as to move while facing the first member 610. The coupling member includes a fixed coupling member 640 and a movable coupling member 630. The fixed coupling member 640 is rotatably coupled to the fixed end of the elastic body 650. The movable coupling member 630 moves the movable end of the elastic body 650.

Figure 11:
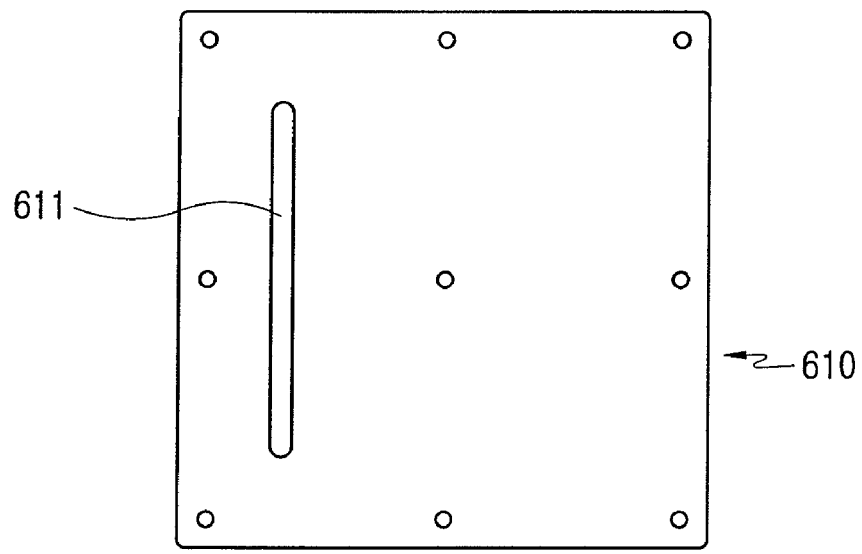
FIG. 11 is a front view illustrating the first member of the one-directional and semi-automatic sliding device illustrated in FIG. 10.

As illustrated in FIG. 11, the first member 610 has a guide opening 611 formed therein. The guide opening 611 extends linearly in a longitudinal direction of the first member 610.

Figure 12A:
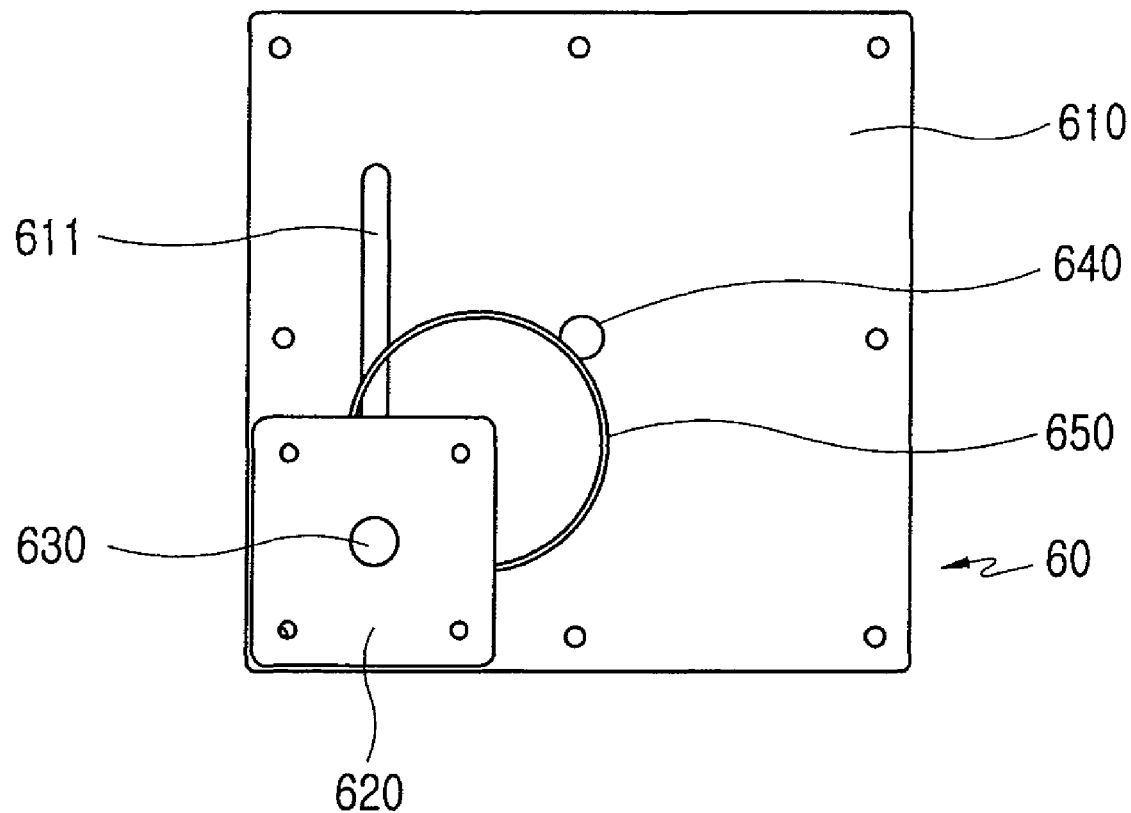
FIGS. 12A to 12C are front views illustrating the operation of the one-directional and semi-automatic sliding device illustrated in FIG. 10.
Figure 12B:
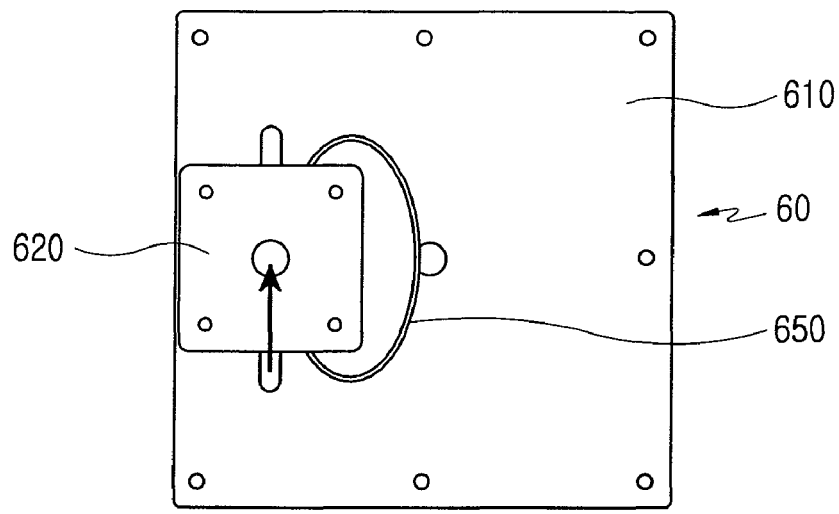
Figure 12C:
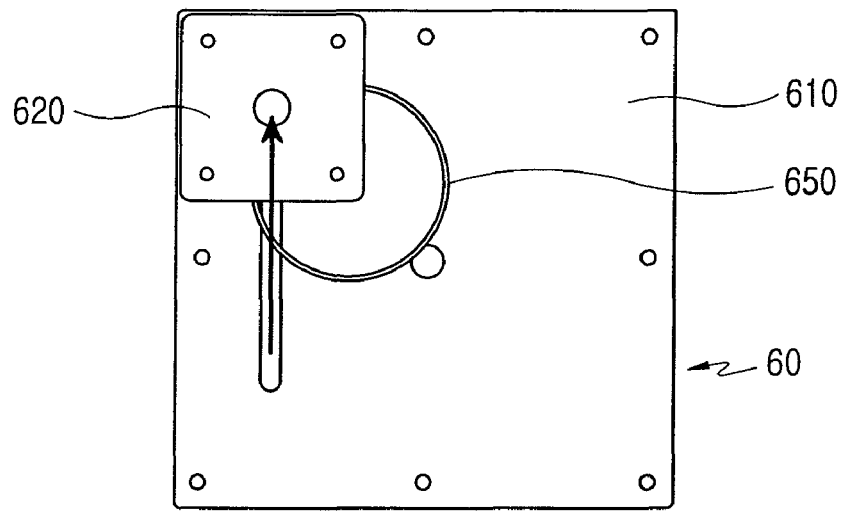
Figure 13:
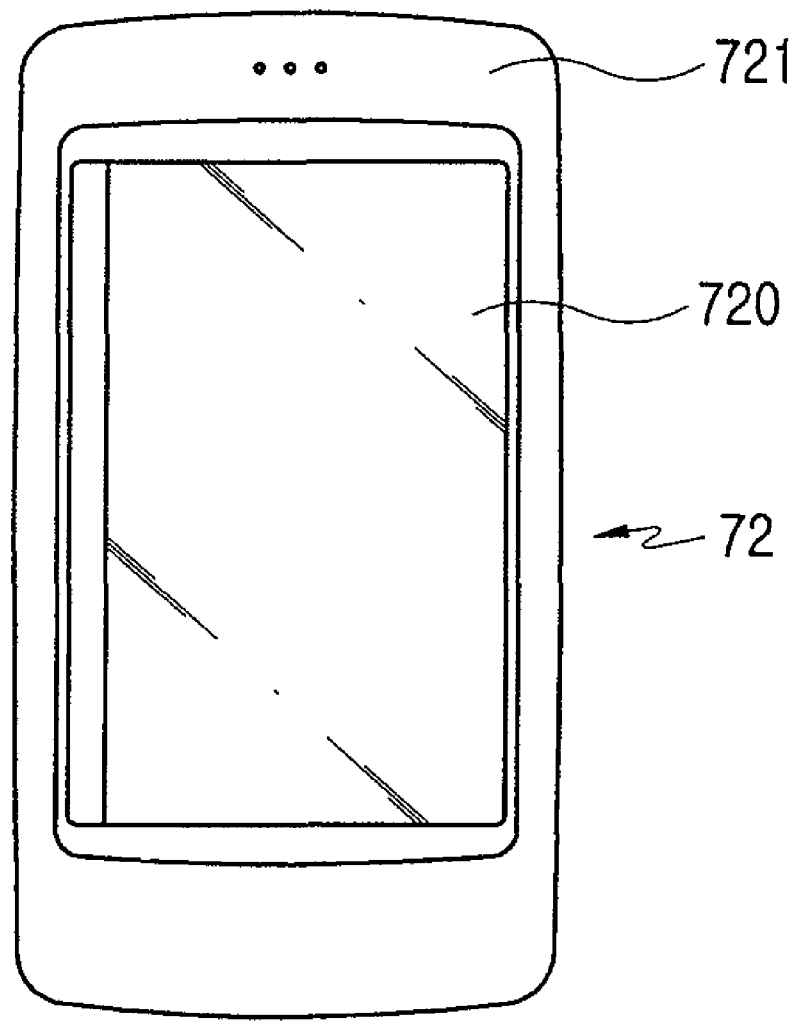
FIG. 13 is a front view illustrating a portable communication terminal employing a three-directional and semi-automatic sliding device according to an exemplary embodiment of the present invention.

When a user pushes the sliding housing, i.e., the second member, in a longitudinal direction by a desired distance, the sliding housing moves from the position illustrated in FIG. 12A to the position illustrated in FIG. 12B. When the user continues to push the second member 620 in the longitudinal direction, the sliding housing is automatically moved to the position illustrated in FIG. 12C by the driving force of the elastic body 650.

The configuration of a three-directional sliding-type portable communication terminal and a three-directional semi-automatic sliding device according to an exemplary embodiment of the present invention will now be described.

As illustrated in FIGS. 13 to 16, a sliding-type portable communication terminal 70 employing a three-directional semi-automatic sliding device includes a body housing 71, a sliding housing 72, and a three-directional semi-automatic sliding device 74 (see FIG. 17) for semi-automatically moving the sliding housing 72 on the body housing 71 in three directions. The three-directional semi-automatic sliding device 74 will be described in further detail below.

Figure 14:
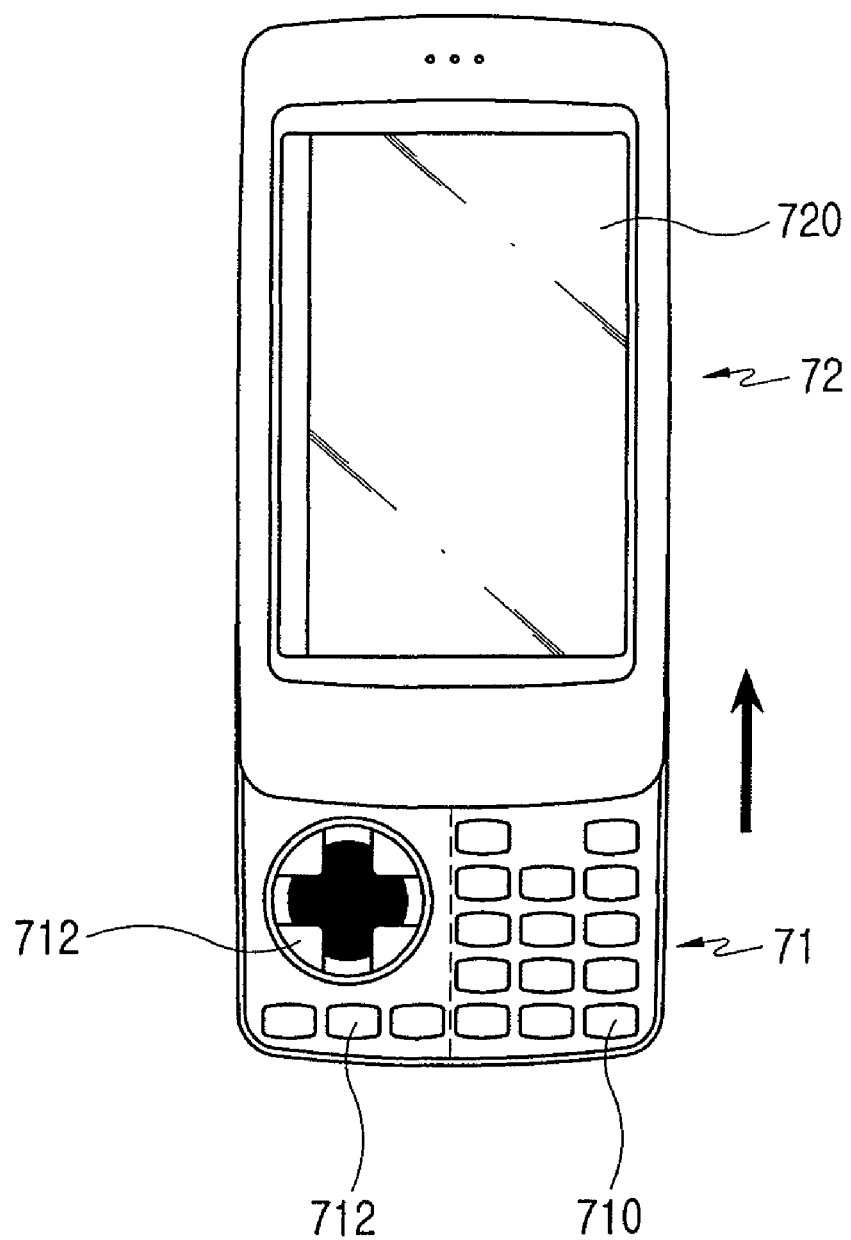
FIG. 14 is a front view illustrating the portable communication terminal illustrated in FIG. 13 with the sliding housing of the portable communication terminal moved longitudinally.
Figure 15:
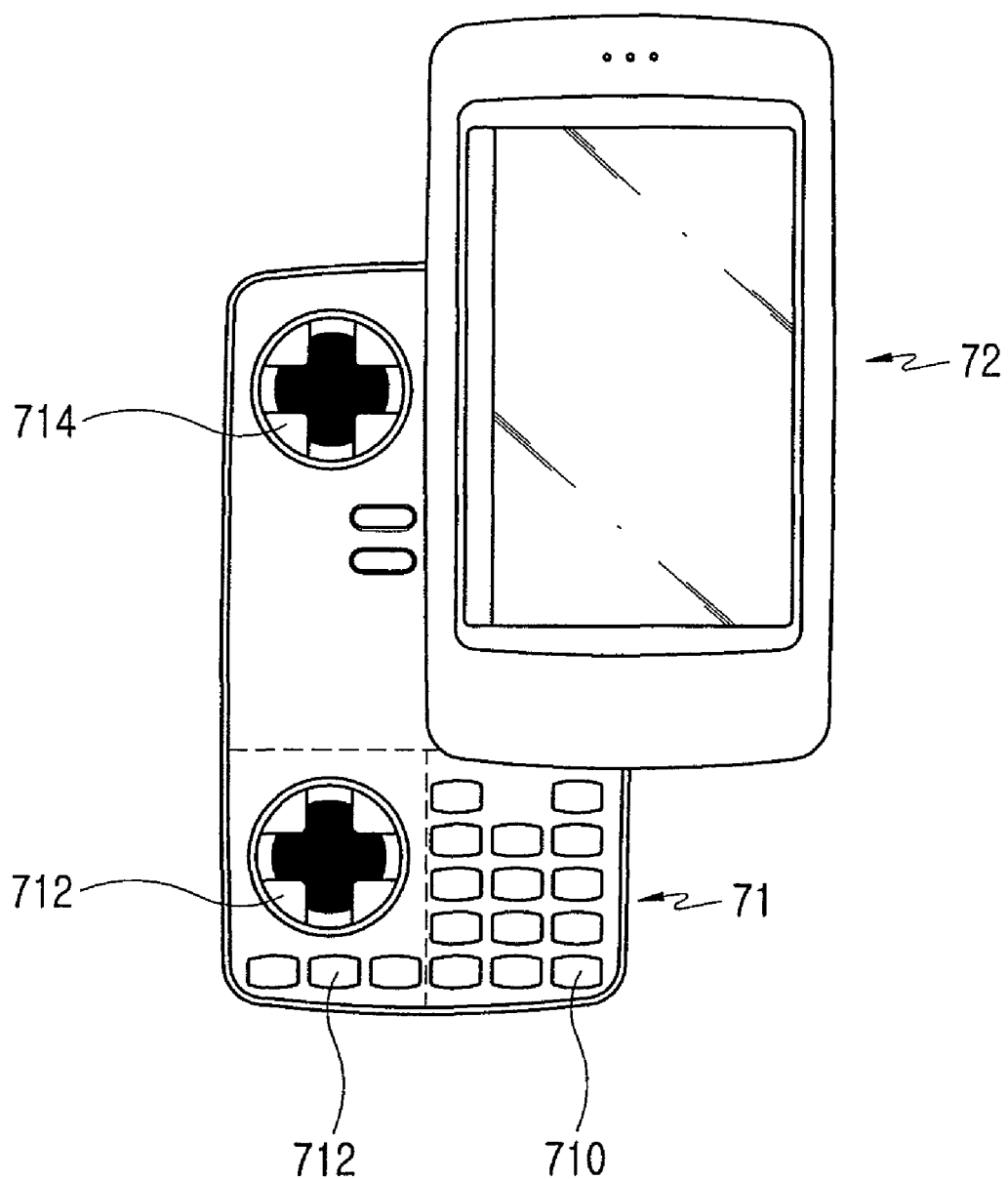
FIG. 15 is a front view illustrating the portable communication terminal illustrated in FIG. 13 with the sliding housing of the portable communication terminal moved in a first transverse direction.
Figure 16:
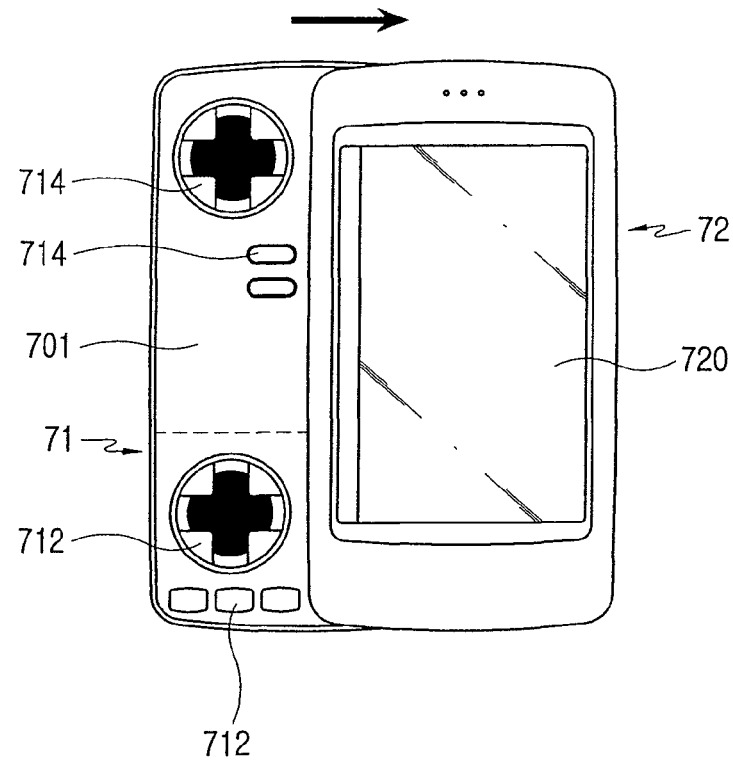
FIG. 16 is a front view illustrating the portable communication terminal illustrated in FIG. 13 with the sliding housing of the portable communication terminal moved in a second transverse direction.

The sliding housing 72 moves on the body housing 71 in three directions. FIG. 14 illustrates the sliding housing 72 after the first sliding housing is moved in a first direction (longitudinal direction). FIG. 15 illustrates the sliding housing 72 after the sliding housing is moved in a second direction (a first transverse direction). FIG. 16 illustrates the sliding housing 72 after the sliding housing is moved in a third direction (a second transverse direction). The movement of the sliding housing 72 in the first, second and third directions is substantially linear. Further, the sliding housing 72 is moved in the second direction after the sliding housing is moved in the first direction.

The body housing 71 has a plurality of first, second and third keys 710, 712 and 714 on an upper surface 701 of the body housing. The first keys 710 are opened after the sliding housing 72 is moved in the longitudinal and first transverse directions, the second keys 712 are always opened when the sliding housing 72 is moved, and the third keys 714 are opened and closed as the sliding housing 72 moves in the first and second transverse directions. Specifically, the second keys 712 are always opened when the sliding housing 72 moves in the longitudinal, the first and second directions. However, the first and third keys 710 and 714 are alternatively opened and closed depending on the movement direction of the sliding housing. The second and third keys 712 and 714 may include a four-directional key for games and the like. The sliding housing 72 has a display unit 720 mounted on the upper surface 721 thereof.

The three-directional portable communication terminal according to an exemplary embodiment of the present invention is configured to slide in three directions so as to provide optimal user interface (UI) environments for the various modes of the portable terminal.

Figure 17:
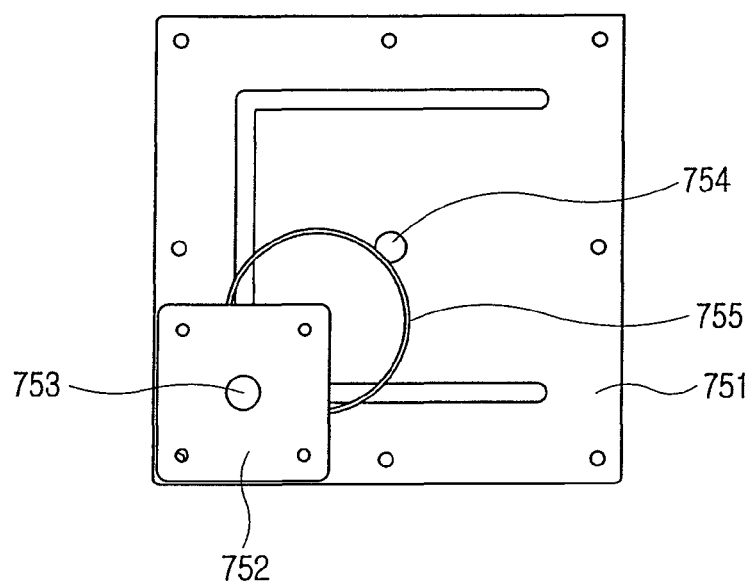
FIG. 17 is a front view illustrating the three-directional and semi-automatic sliding device of the portable terminal illustrated in FIG. 13.

The configuration of the three-directional semi-automatic sliding device 74 will be described with reference to FIGS. 17 and 18. The three-directional semi-automatic sliding device 74 has substantially the same components as that of the two-directional semi-automatic sliding device 30 illustrated in FIGS. 4 to 7E, except for the shape of guide openings 7511, 7512 and 7513 formed in the first member 751. Specifically, the three-directional semi-automatic sliding device has a second member 752, an elastic body 755, a movable coupling member 753, and a fixed coupling member 754 which are substantially the same as the corresponding components of the two-directional semi-automatic sliding device. Therefore, a description of these components will not be repeated.

The three-directional semi-automatic sliding device 74 includes first and second members 751 and 752 having a plate shape, and an elastic body 755 partially disposed between the first and second members 751 and 752 so as to provide a driving force to the second member 752. The first member 751 is coupled to the upper surface of the body housing by a coupling member, or the upper surface of the body housing may be used as the first member 751. Further, the second member 752 is coupled to the bottom surface of the sliding housing by a coupling member, or the bottom surface of the sliding housing may be used as the second member 752. If the upper surface of the body housing and the bottom surface of the sliding housing are used as the first and second members 751 and 752, respectively, it is easier to make the portable communication terminal slimmer.

The second member 752 moves in the three-directions of the first member 751, i.e., the longitudinal direction and the first and second transverse directions, while facing the first member 751. The second sliding movement of the second member 752 is carried out after the movement in the longitudinal direction. In addition, the first transverse direction is substantially perpendicular to the longitudinal direction, and the second transverse direction is substantially parallel with the first transverse direction and substantially perpendicular to the longitudinal direction.

The elastic body 755 is used as a semi-automatic driving source for driving the second member 752. The semi-automatic driving source applies force to the first member 71 so as to return the first member 71 to the first position when the first member 71 moves in a longitudinal direction by a distance shorter than a predetermined distance, while applying force to the first member 71 so as to move the first member 71 to the second position after the first member 71 moves in the longitudinal direction by a distance longer than the predetermined distance. Further, the semi-automatic driving source applies force to the first member 71 so as to return the first member 71 to the second position when the first member 71 moves in the first transverse direction by a distance shorter than the predetermined distance, while applying force to the first member 71 so as to move the first member 71 to the third position after the first member 71 moves in the first transverse direction by a distance longer than the predetermined distance. Furthermore, the semi-automatic driving source applies force to the first member 71 so as to return the first member 71 to the first position when the first member 71 moves in the second transverse direction by a distance shorter than the predetermined distance, while applying force to the first member 71 so as to move the first member 71 to the fourth position after the first member 71 moves in the second transverse direction by a distance longer than the predetermined distance.

The second member 752 is coupled to the first member 751 by a coupling member, so as to move while facing the first member 751. The coupling member includes a fixed coupling member 754 and a movable coupling member 753. The fixed coupling member 754 is rotatably coupled to the fixed end of the elastic body 755, and the movable coupling member 753 moves the movable end of the elastic body 755.

Figure 18:
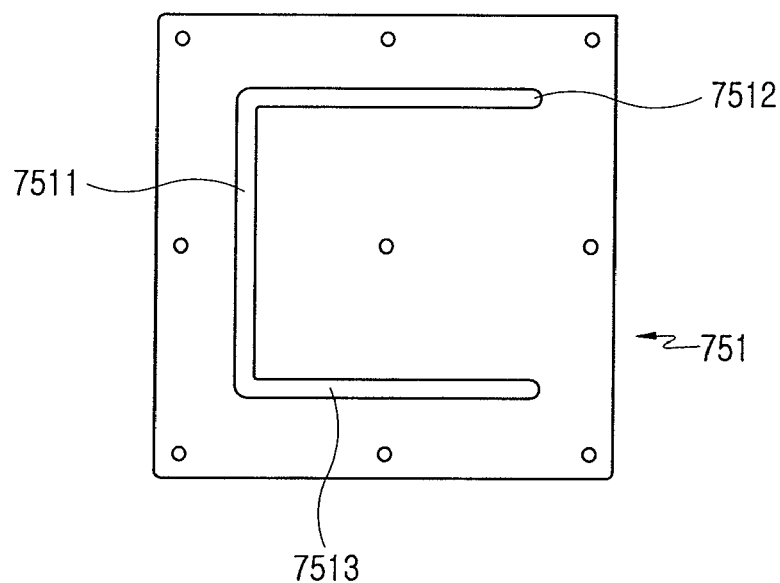
FIG. 18 is a front view illustrating a first member of the three-direction semi-automatic sliding device illustrated in FIG. 17.

As illustrated in FIG. 18, the first member 751 has first, second and third guide openings 7511, 7512 and 7513 which are arranged in a 'C' shape. The first guide opening 7511 guides the longitudinal sliding movement of the second member 752, the second guide opening 7512 guides the first transverse sliding movement of the second member 752, and the third guide opening 7513 guides the second transverse sliding movement of the second member 752. The movement of the second member 752 in the first, second and third guide openings has already been described and the description thereof will not be repeated. Of course, when the second member 752 moves along the first, second and third guide openings 7511, 7512 and 7513, the elastic body 755 functions as a semi-automatic driving source.

Figure 19:
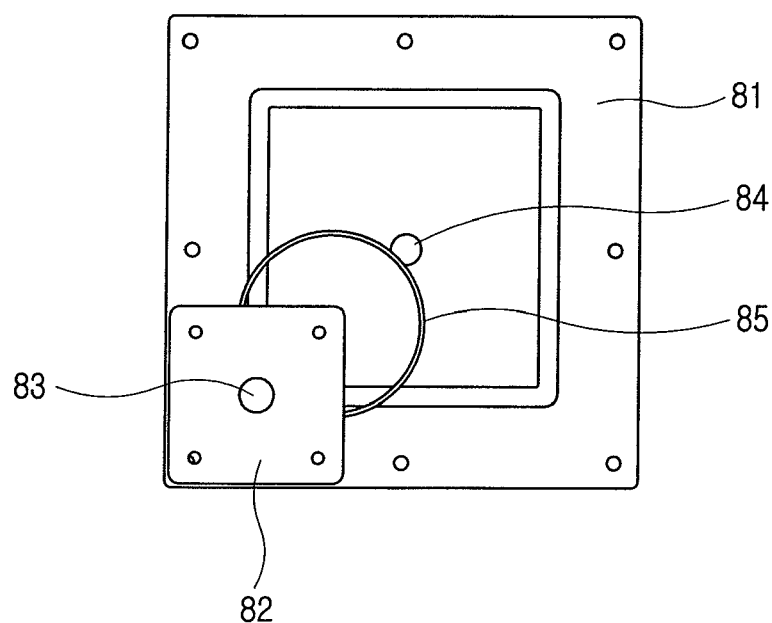
FIG. 19 is a front view illustrating a four-directional and semi-automatic sliding device according to an exemplary embodiment of the present invention.

The configuration of a four-directional semi-automatic sliding device 80 according to an exemplary embodiment of the present invention will be described with reference to FIGS. 19 and 20. The four-directional semi-automatic sliding device 80 has substantially the same components as that of the two-directional semi-automatic sliding device 30 illustrated in FIGS. 4 to 7E, except for the shape of guide openings 811, 812, 813, and 814 formed in the first member 81. Specifically, the four-directional semi-automatic sliding device has a second member 82, an elastic body 85, a movable coupling member 83, and a fixed coupling member 84 which are substantially the same as the corresponding components of the two-directional semi-automatic sliding device. Therefore, a description of these components will not be repeated.

The four-directional semi-automatic sliding device 80 includes first and second members 81 and 82 having a plate shape, and an elastic body 85 partially disposed between the first and second members 81 and 82 so as to provide a driving force to the second member 82. The first member 81 is coupled to the upper surface of the body housing by a coupling member, or the upper surface of the body housing may be used as the first member 81. Further, the second member 82 is coupled to the bottom surface of the sliding housing by a coupling member, or the bottom surface of the sliding housing may be used as the second member 82. If the upper surface of the body housing and the bottom surface of the sliding housing are used as the first and second members 81 and 82, respectively, it is easier to make the portable communication terminal slimmer.

The second member 82 moves in the four-directions of the first member 81, i.e., the first and second longitudinal directions and the first and second transverse directions, while facing the first member 81. The second transverse sliding movement of the second member 82 is carried out after the movement in the first longitudinal direction. In addition, the first transverse direction is substantially perpendicular to the first longitudinal direction, and the second transverse direction is substantially parallel with the first transverse direction and substantially perpendicular to the first and second longitudinal direction. The second transverse direction is substantially parallel with the first longitudinal direction and substantially perpendicular to the first and second transverse directions.

The elastic body 85 is used as a semi-automatic driving source for driving the second member 82. The semi-automatic driving source applies force to the first member 81 so as to return the first member 81 to the first position when the first member 81 moves in the first longitudinal direction by a distance shorter than a predetermined distance, while applying force to the first member 81 so as to move the first member 81 to the second position when the first member 81 moves in the first longitudinal direction by a distance longer than the predetermined distance. Further, the semi-automatic driving source applies force to the first member 81 so as to return the first member 81 to the second position when the first member 81 moves in the first transverse direction by a distance shorter than the predetermined distance, while applying force to the first member 81 so as to move the first member 81 to the third position when the first member 81 moves in the first transverse direction by a distance longer than the predetermined distance. Furthermore, the semi-automatic driving source applies force to the first member 81 so as to return the first member 81 to the third position when the first member 81 moves in the second longitudinal direction by a distance shorter than the predetermined distance, while applying force to the first member 81 so as to move the first member 81 to the fourth position after the first member 81 moves in the second transverse direction by a distance longer than the predetermined distance. In addition, the semi-automatic driving source applies force to the first member 81 so as to return the first member 81 to the first position when the first member 81 moves in the second transverse direction by a distance shorter than the predetermined distance, while applying force to the first member 81 so as to move the first member 81 to the fourth position after the first member 81 moves in the second transverse direction by a distance longer than the predetermined distance.

The second member 82 is coupled to the first member 81 by a coupling member, so as to move while facing the first member 81. The coupling member includes a fixed coupling member 84 and a movable coupling member 83. The fixed coupling member 84 is rotatably coupled to the fixed end of the elastic body 85, and the movable coupling member 83 moves the movable end of the elastic body 85.

Figure 20:
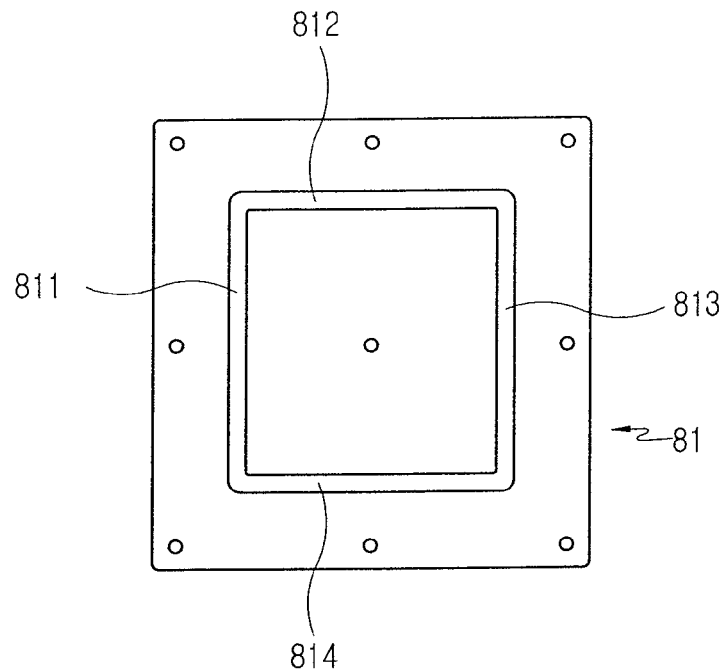
FIG. 20 is a front view illustrating the first member of the four-directional and semi-automatic sliding device illustrated in FIG. 19.

As illustrated in FIG. 20, the first member 81 has first, second, third and fourth guide openings 811, 812, 813 and 814 which are arranged in a 'D' shape. The first guide opening 811 guides the longitudinal sliding movement of the second member 82, the second guide opening 812 guides the first transverse sliding movement of the second member 82, the third guide opening 813 guides the second longitudinal sliding movement of the second member 82, and the fourth guide opening 814 guides the second transverse sliding movement of the second member 82. The movement of the second member 82 in the first, second, third and fourth guide openings has already been described and the description thereof will not be repeated. Of course, when the second member 82 moves along the first, second, third and fourth guide openings 811, 812, 813 and 814, the elastic body 85 functions as a semi-automatic driving source.

Figure 21:
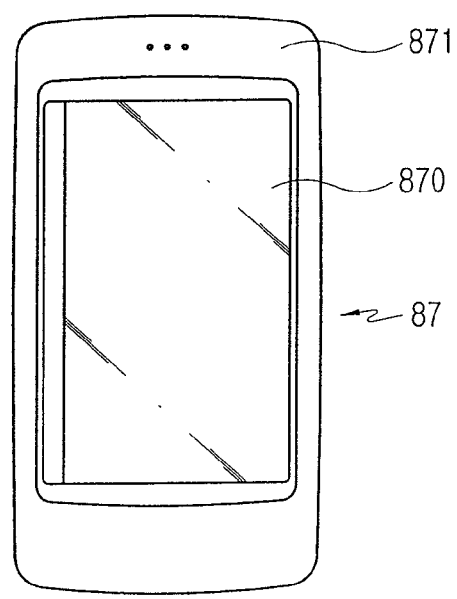
FIG. 21 is a front view illustrating a portable communication terminal employing a diagonal and semi-automatic sliding device according to an exemplary embodiment of the present invention.
Figure 22:
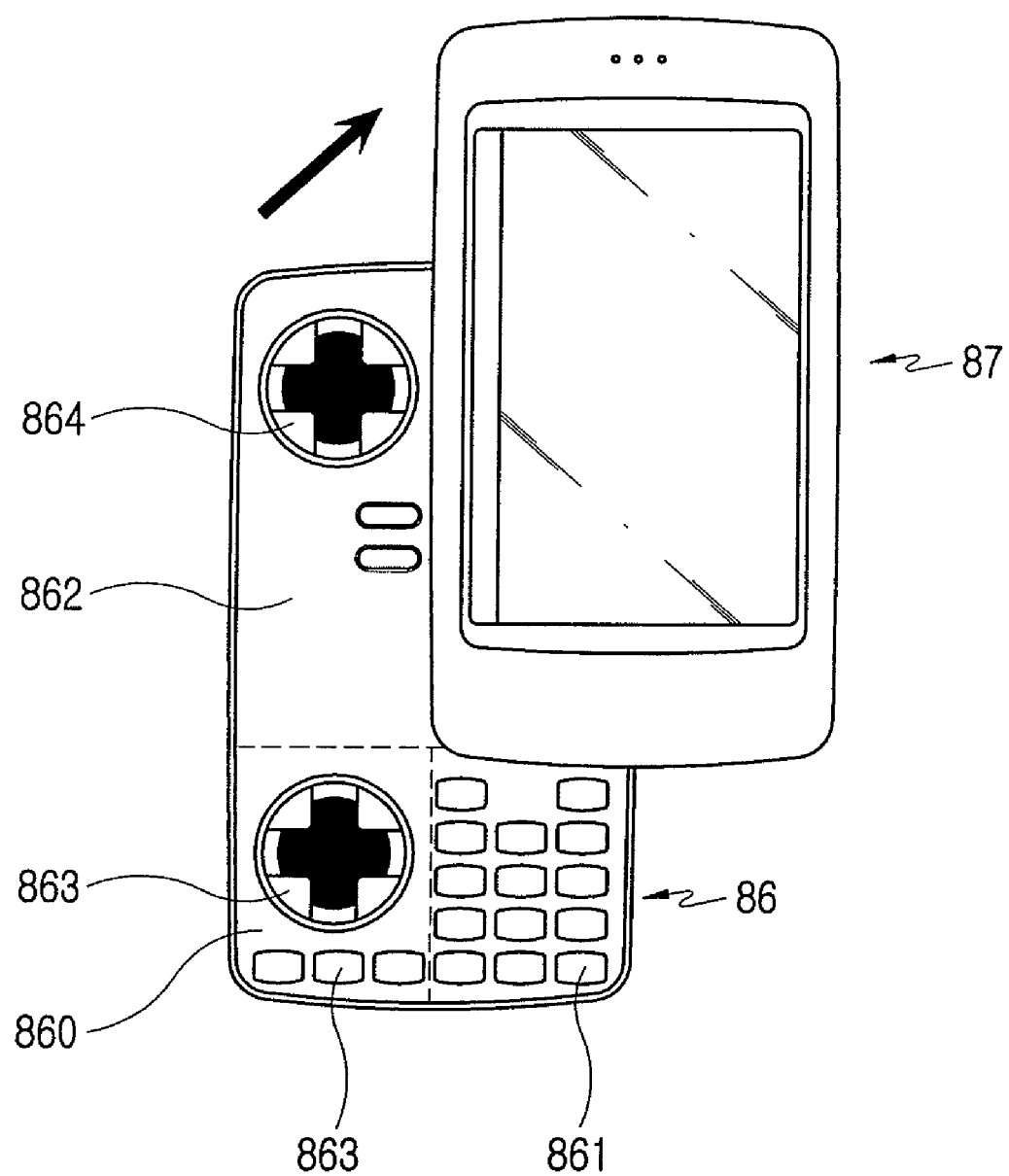
FIG. 22 is a front view illustrating the portable communication terminal illustrated in FIG. 21 with the sliding housing of the portable communication terminal moved diagonally.

The configuration of a portable communication terminal employing a diagonal semi-automatic sliding device according to an exemplary embodiment of the present invention will now be described with reference to FIGS. 21 and 22. The sliding-type portable communication terminal 90 includes a body housing 86, a sliding housing 87, and a semi-automatic sliding device 88 (see FIG. 23) for moving the sliding housing 87 on the body housing 86 in a diagonal direction. The semi-automatic sliding device 88 will be described in further detail below. The sliding housing 87 moves on the body housing 86 in a diagonal direction while facing the body housing 86. In addition, the sliding device 88 connects the sliding housing 87 to the body housing 86 and applies driving force to the sliding housing 87 so that the sliding housing 87 can move semi-automatically. The sliding device is not limited to a semi-automatic driving source, but may be a manual driving source.

The sliding housing 87 moves on the body housing 86 in the diagonal direction of the body housing 86, so as to open and close a desired region on the upper surface of the body housing 86. FIG. 22 illustrates the sliding housing 87 after it has been moved diagonally. The desired region of the body housing includes the first region 860 defined transversely and the second region 862 defined longitudinally. Specifically, the first region 860 extends in a transverse direction of the body housing 86, and the second region 862 extends in a longitudinal direction of the body housing 86.

The body housing 86 has a plurality of keys 861, 863 and 864 arranged on the upper surface thereof, and the sliding housing 87 has a display unit 870 mounted on the upper surface 871 of the sliding housing 87. The keys 861, 863 and 864 are exposed to the outside or covered with the sliding housing 87 according to whether the sliding housing 87 slides or not.

Figure 23:
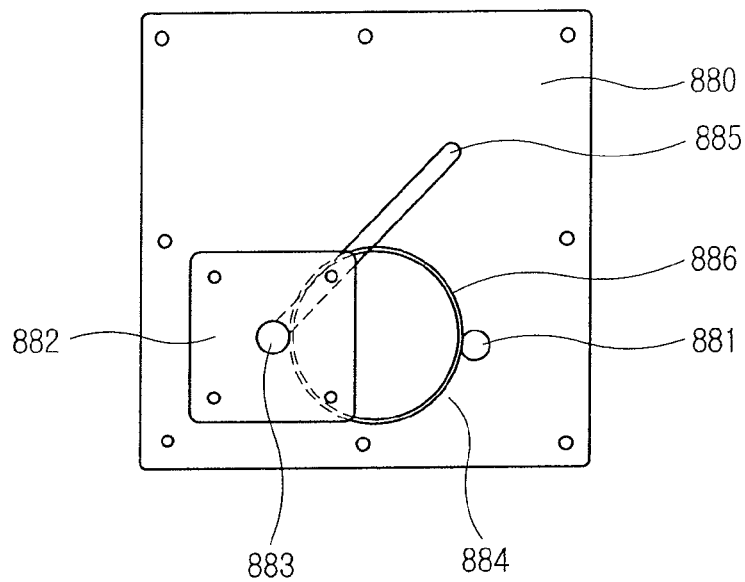
FIG. 23 is a front view illustrating the diagonal and semi-automatic sliding device of the portable terminal illustrated in FIG. 22.
Figure 24:
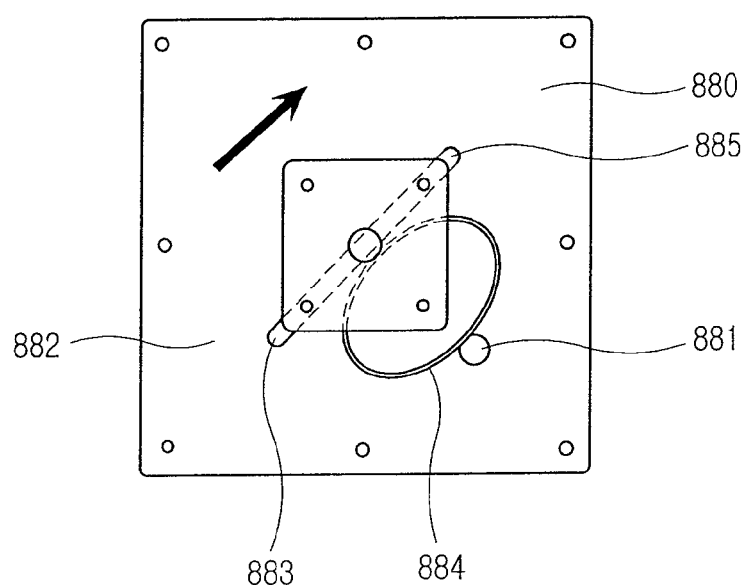
FIG. 24 is a front view illustrating the movement of the second member of the diagonal and semi-automatic sliding device illustrated in FIG. 23.
Figure 25:
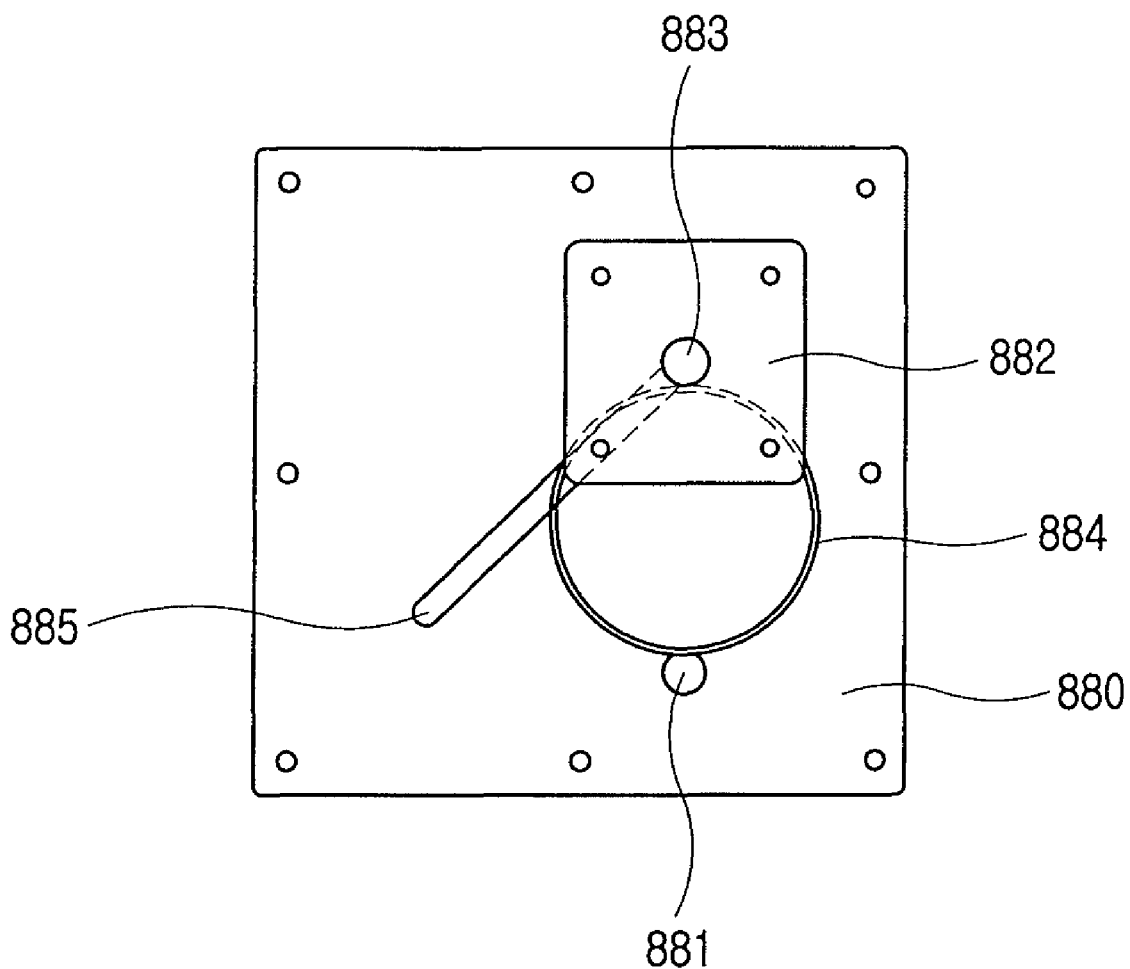
FIG. 25 is a front view illustrating the sliding movement of the second member of the diagonal and semi-automatic sliding device illustrated in FIG. 23.

The configuration of the diagonal semi-automatic sliding device 88 according to an exemplary embodiment of the present invention will be described with reference to FIGS. 23 to 25. The diagonal semi-automatic sliding device 88 includes first and second members 880 and 882 having a plate shape, a guide member 885 for guiding the movement of the second member in the diagonal direction, and an elastic body 886 partially disposed between the first and second members 880 and 882 and used as a semi-automatic driving source for applying driving force to the second member 882. The first member 880 is coupled to the upper surface of the body housing by a coupling member such as a screw (not illustrated), or the upper surface of the body housing may function as the first member. Further, the second member 882 is coupled to the bottom surface of the sliding housing by a coupling member (not illustrated), or the bottom surface of the sliding housing may function as the second member. If the upper surface of the body housing and the bottom surface of the sliding housing function as the first and second members 880 and 882, respectively, it is easier to make the portable communication terminal slimmer.

The second member 882 slides in the diagonal direction of the first member 880 while facing the first member 880.

The elastic body 886 includes a fixed end 881 rotatably connected to the first member 880, a movable end 883 rotatably connected to the second member 882 and diagonally moving along with the second member 882 in the guide means 885, and an elastic member 884 formed between the fixed end 881 and the movable end 883 and functioning as a semi-automatic driving source so as to apply driving force to the second member 882.

The elastic member 884 has a closed loop shape, preferably, a ring shape. In the state illustrated in FIG. 23, when a user applies force to the second member 882 so as to move the second member 882 by a desired distance in a diagonal direction, the elastic member 884 is deformed from a circular shape to an elliptical shape. When the user continues to move the second member 882 by a distance longer than the desired distance, the elastic member 884 applies driving force to the second member 882. In other words, the user manually moves the sliding housing by a distance shorter than the predetermined distance, and the elastic member 884 applies driving force to the sliding housing so that the sliding housing automatically moves over a distance longer than the predetermined distance.

Figure 26:
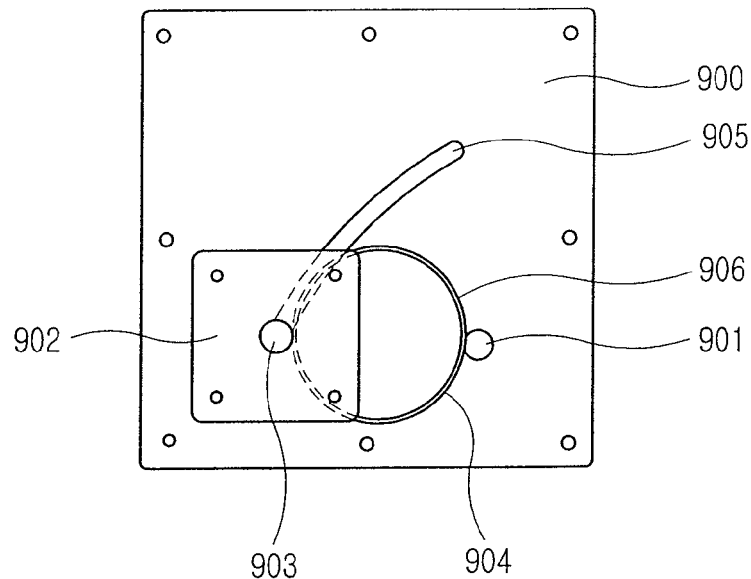
FIG. 26 is a front view illustrating a curved and semi-automatic sliding device according to an exemplary embodiment of the present invention.
Figure 27:
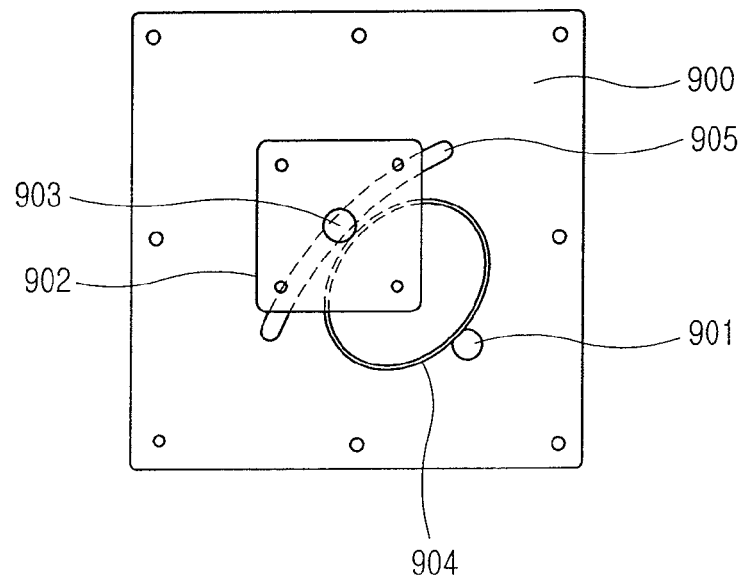
FIG. 27 is a front view illustrating the movement of the second member of the curved and semi-automatic sliding device illustrated in FIG. 26.
Figure 28:
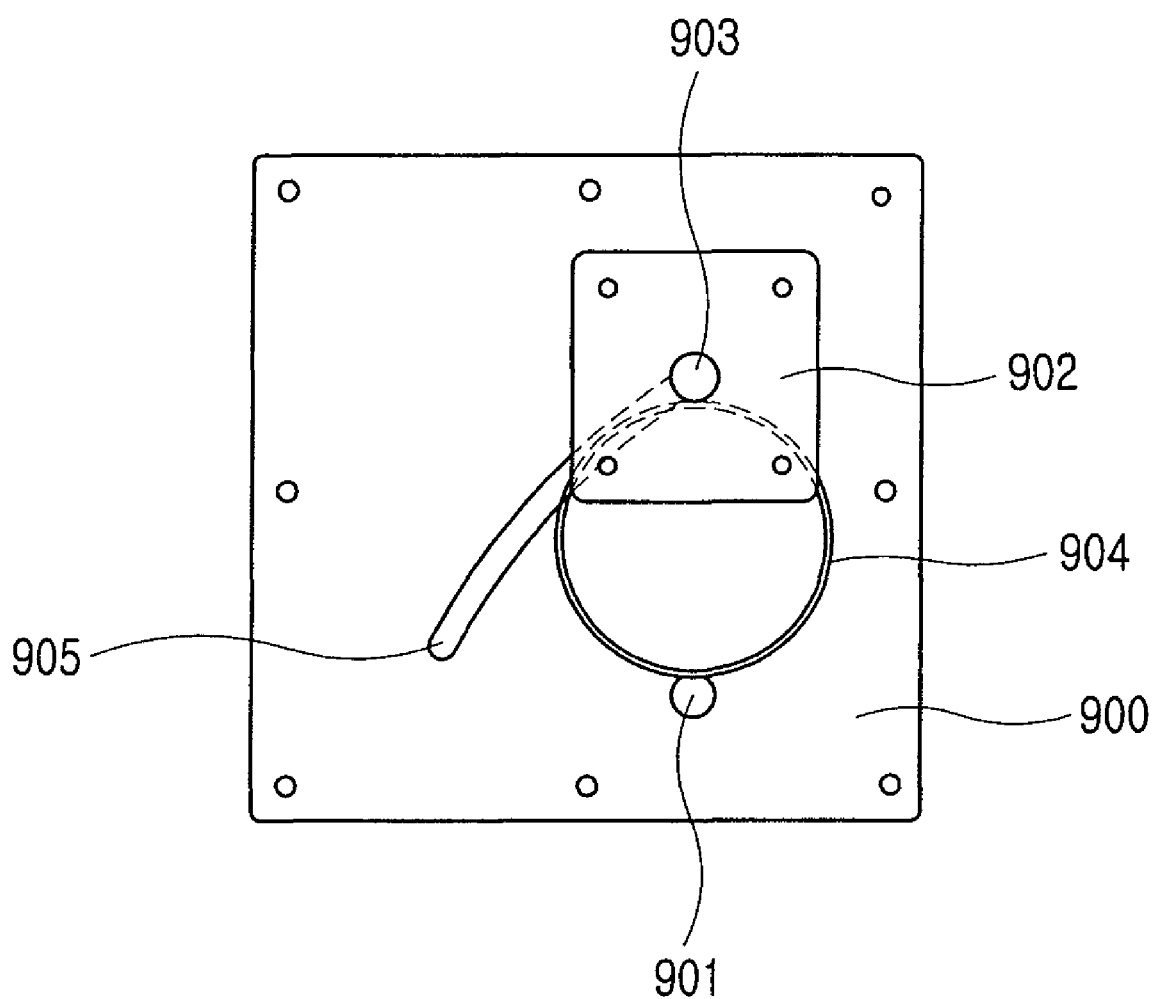
FIG. 28 is a front view illustrating the sliding movement of the second member of the curved and semi-automatic sliding device illustrated in FIG. 26.

Referring to FIGS. 26 to 28, the configuration of a curved semi-automatic sliding device 90 according to an exemplary embodiment of the present invention will be described. The curved semi-automatic sliding device 90 includes first and second members 900 and 902 having a plate shape, a guide member 905 for guiding the movement of the second member along a curved guide slot, and an elastic body 906 coupled to the first and second members 900 and 902 between the first and second members 900 and 902 and functioning as a semi-automatic driving source for driving the second member 902. The first member 900 is coupled to the upper surface of the body housing by a coupling member such as a screw (not illustrated), or the upper surface of the body housing may be used as the first member. Further, the second member 902 is coupled to the bottom surface of the sliding housing by the coupling member (not illustrated), or the bottom surface of the sliding housing may be used as the second member. If the upper surface of the body housing and the bottom surface of the sliding housing are used as the first and second members 900 and 902, respectively, it is easier to make the portable communication terminal slimmer.

The second member 902 moves along the curved guide slot of the first member 900 while facing the first member 900.

The elastic body 906 includes a fixed end 901 rotatably connected to the first member 900, a movable end 903 rotatably connected to the second member 902 and moved along with the second member 902 by the guide member 905, and an elastic member 904 formed between the fixed end 901 and the movable end 903 and functioning as a semi-automatic driving source for driving the second member 902.

The elastic member 904 has a closed loop shape, preferably a ring shape. In the state illustrated in FIG. 23, when a user applies driving force to the second member 902 so as to move the second member 902 along a curved guide slot by a desired distance, the elastic member 904 is deformed from the circular shape to an elliptical shape. When the user continues to move the second member 902 by a distance longer than the desired distance, the elastic member 904 applies driving force to the second member 882. In other words, the user manually moves the sliding housing by a distance shorter than the predetermined distance, and the elastic member 884 applies driving force to the sliding housing so that the sliding housing automatically moves over a distance longer than the predetermined distance.

The guide member 905 has a curved shape, and includes a curved guide slot. The guide slot 905 is curved in a direction away from the fixed end 901. The curved guide slot may be formed to have a 'C' shape.

Further, in the semi-automatic sliding device according to the exemplary embodiments of the present invention, the shape of the guide slot and the elastic member may be changed to allow the second member to slide semi-automatically in different ways. Furthermore, the elastic body may be removed from the sliding device, resulting in the manual movement of the sliding device.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A semi-automatic sliding device of a sliding-type portable communication terminal comprising a body housing and a sliding housing sliding on the body housing in a longitudinal direction, the sliding device comprising:
   a first member;
   a second member alternatively moving in a transverse or longitudinal direction of the first member while facing the first member;
   a guide for guiding the movement of the second member in a transverse or longitudinal direction with regard to the first member; and
   a ring shape elastic body rotatably coupled at opposite ends at its circumference to the first and second members and functioning as a semi-automatic driving source for driving the second member in the transverse or longitudinal directions,
   wherein the ring shape elastic body exerts a force, when deformed, in a direction from a center of the ring shape towards a periphery of the ring shape,
   wherein the force drives the second member towards a fully extended state if the second member is in a substantially extended state in the transverse or longitudinal direction, and
   wherein the force drives the second member towards a fully retracted state if the second member is in a substantially retracted state in the transverse or longitudinal direction.

2. The semi-automatic sliding device as claimed in claim 1, wherein the ring shape elastic body
   is deformed during movement of the second member,
   supplies a driving force to move the second member to an initial position when the second member moves by a distance shorter than a desired distance in the transverse or longitudinal direction, and
   supplies driving force to move the second member to a termination position when the second member moves farther than the desired distance in the transverse or longitudinal direction.

3. The semi-automatic sliding device as claimed in claim 1, wherein the ring shape elastic body comprises:
   a fixed end rotatably connected to the first member;
   a movable end rotatably connected to the second member and moving along with the second member in the transverse or longitudinal direction of the first member; and
   an elastic member disposed between the fixed end and the movable end and functioning as a semi-automatic driving source of the second member,
   wherein the fixed end and the movable end are substantially symmetrically arranged around the ring shape elastic body,
   wherein the fixed end, the movable end and the elastic member are integrally formed, and
   wherein the ring shape elastic body exerts a force, when deformed, in a direction from a center of the ring shape towards a periphery of the ring shape.

4. The semi-automatic sliding device as claimed in claim 3, wherein
   the ring shape elastic body is deformed in an elliptical shape while supplying the driving force.

5. The semi-automatic sliding device as claimed in claim 1, wherein
   an upper surface of the body housing functions as the first member, and
   a bottom surface of the sliding housing functions as the second member.

6. A semi-automatic sliding device of a sliding-type portable communication terminal comprising a body housing and a sliding housing sliding on the body housing in a longitudinal direction, the semi-automatic sliding device comprising:
- a first member;
- a second member;
- coupling means for restricting the second member so that the second member moves while facing the first member;
- guide means for guiding the movement of the second member in a transverse or longitudinal direction with regard to the first member; and
- a ring shape elastic body rotatably coupled at opposite ends at its circumference to the first and second members and functioning as a semi-automatic driving source for driving the second member,
- wherein the ring shape elastic body exerts a force, when deformed, in a direction from a center of the ring shape towards a periphery of the ring shape,
- wherein the force drives the second member towards a fully extended state if the second member is in a substantially extended state in the transverse or longitudinal direction, and
- wherein the force drives the second member towards a fully retracted state if the second member is in a substantially retracted state in the transverse or longitudinal direction.

7. The semi-automatic sliding device as claimed in claim 6, wherein the coupling means comprises:
- a fixed coupling member for fixing a first portion of the ring shape elastic body; and
- a movable coupling member for moving a second portion of the ring shape elastic body.

8. The semi-automatic sliding device as claimed in claim 6, wherein the ring shape elastic body comprises:
- a fixed end rotatably connected to the first member by the coupling means;
- a movable end rotatably connected to the second member by the coupling means and moved along with the second member by the guide means in the transverse or longitudinal direction; and
- an elastic member disposed between the fixed end and the movable end and functioning as a semi-automatic driving source for driving the second member.

9. The semi-automatic sliding device as claimed in claim 6, wherein the guide means comprises a slot,
- wherein the pathway comprises a first guide slot that extends substantially linearly in the transverse direction of the first member and a second guide slot that communicates with the first guide slot and extends substantially linearly in the longitudinal direction of the first member, and
- wherein the first and second guide slots form an 'L' shape.

10. A semi-automatic sliding device of a sliding-type portable communication terminal comprising a body housing and a sliding housing sliding on the body housing, the sliding device comprising:
- a first member;
- a second member;
- coupling means for restricting the second member so that the second member moves while facing the first member;
- guide means for guiding the movement of the second member on the first member in a predetermined direction; and
- a ring shape elastic body rotatably coupled at opposite ends at its circumference to the first and second members, the ring shape elastic body supplying driving force to move the second member to a fully retracted position if the second member is in a substantially retracted position and supplying driving force to move the second member to a fully extended position if the second member is in a substantially extended position,
- wherein the ring shape elastic body exerts the driving force, when deformed, in a direction from a center of the ring shape towards a periphery of the ring shape, and
- wherein the coupling means comprises a fixed coupling member for rotatably fixing a first portion of the ring shape elastic body; and a movable coupling member for rotatably moving a second portion of the ring shape elastic body.

11. The semi-automatic sliding device as claimed in claim 10, wherein the ring shape elastic body comprises:
- a fixed end rotatably connected to the first member by the fixed coupling member;
- a movable end rotatably connected to the second member by the movable coupling member; and
- an elastic member disposed between the fixed end and the movable end and functioning as a semi-automatic driving source for driving the second member.

12. A sliding-type portable communication terminal comprising:
- a body housing comprising a plurality of keys on an upper surface of the body housing;
- a sliding housing comprising a display unit mounted on the upper surface of the body housing and sliding on the body housing in a longitudinal, first transverse, or second transverse direction, so as to open and close a desired region on the upper surface of the body housing; and
- a three-directional sliding device for connecting the sliding housing to the body housing,
- wherein the keys comprise first keys opened only after the sliding housing moves to a first fully open state from a fully closed state in the longitudinal direction or when sliding in the first transverse direction, second keys opened as the sliding housing slides to the first fully open state from the fully closed state in the longitudinal direction, when sliding in the first transverse direction, or as the sliding housing slides to a second fully open state from the fully closed state in the second transverse direction, and third keys opened only as the sliding housing moves to the second fully open state from the fully closed state in the second transverse direction or moves to a third fully open state from a partially closed state in first transverse direction,
- wherein the first, second, and third keys comprise mutually exclusive keys, and
- wherein the first keys and the second keys are positioned horizontally to each other, and the second keys and the third keys are positioned vertically to each other.

13. The sliding-type portable communication terminal as claimed in claim 12, wherein the three-directional sliding device operates semi-automatically by providing a driving force for driving the sliding housing towards a fully extended state if the sliding housing is in a substantially extended state in the first transverse, second transverse, or longitudinal direction, and for driving the sliding housing towards a fully retracted state if the sliding housing is in a substantially retracted state in the first transverse, second transverse, or longitudinal direction.

14. The sliding-type portable communication terminal as claimed in claim 13, wherein
- the first transverse direction is substantially perpendicular to the longitudinal direction, and the second transverse direction is substantially parallel with the first transverse direction and substantially perpendicular to the longitudinal direction.

15. A semi-automatic sliding device of a sliding-type portable communication terminal comprising a body housing and a sliding housing sliding on the body housing, the sliding device comprising:
   a first member;
   a second member;
   coupling means for restricting the second member so that the second member moves while facing the first member;
   guide means for guiding the movement of the second member in a first transverse direction substantially perpendicular to a longitudinal direction, or a second transverse direction substantially parallel with the first transverse direction and substantially perpendicular to the longitudinal direction; and
   a ring shape elastic body rotatably coupled at opposite ends at its circumference to the first and second members and functioning as a semi-automatic driving source for the sliding movement of the second member,
   wherein the ring shape elastic body exerts a force, when deformed, in a direction from a center of the ring shape towards a periphery of the ring shape,
   wherein the force drives the second member towards a fully extended state if the second member is in a substantially extended state in the first transverse, second transverse, or longitudinal direction, and
   wherein the force drives the second member towards a fully retracted state if the second member is in a substantially retracted state in the first transverse, second transverse, or longitudinal direction.

16. The semi-automatic sliding device as claimed in claim 15, wherein the ring shape elastic body comprises:
   a fixed end rotatably connected to the first member by the coupling means;
   a movable end rotatably connected to the second member by the coupling means and moved along with the second member by the guide means in the longitudinal, first transverse, or second transverse direction of the first member; and
   an elastic member disposed between the fixed end and the movable end and functioning as a semi-automatic driving source for driving the second member.

17. The semi-automatic sliding device as claimed in claim 15, wherein the guide means comprises:
   a first guide slot extending linearly in the longitudinal direction;
   a second guide slot extending linearly in the first transverse direction; and
   a third guide slot communicating with the first guide slot and extending linearly in the second transverse direction,
   wherein the first, second and third guide slots comprise a '⊏' shape.

18. A semi-automatic sliding device of a sliding-type portable communication terminal comprising a body housing and a sliding housing sliding on the body housing, the sliding device comprising:
   a first member;
   a second member;
   coupling means for restricting the second member so that the second member moves while facing the first member;
   guide means for guiding the movement of the second member in a first longitudinal direction, a second longitudinal direction substantially parallel with the first longitudinal direction, a first transverse direction substantially perpendicular to the first longitudinal direction, or a second transverse direction substantially perpendicular to the first longitudinal direction and substantially parallel with the first transverse direction of the first member; and
   a ring shape elastic body rotatably coupled at opposite ends at its circumference to the first and second members and functioning as a semi-automatic driving source for the sliding movement of the second member,
   wherein the ring shape elastic body exerts a force, when deformed, in a direction from a center of the ring shape towards a periphery of the ring shape,
   wherein the force drives the second member towards a fully extended state if the second member is in a substantially extended state in the first transverse, second transverse, first longitudinal, or second longitudinal direction, and
   wherein the force drives the second member towards a fully retracted state if the second member is in a substantially retracted state in the first transverse, second transverse, first longitudinal, or second longitudinal direction.

19. A sliding-type portable communication terminal comprising a body housing and a sliding housing sliding on the body housing to open and close the upper surface of the body housing while facing the body housing, the portable communication terminal comprising:
   an upper surface of the body housing;
   a bottom surface of the sliding housing;
   guide means for guiding the movement of the sliding housing on the upper surface of the body housing in a transverse or longitudinal direction; and
   a ring shape elastic body rotatably coupled at opposite ends at its circumference to the body housing and the sliding housing, disposed between the bottom surface of the body housing and the upper surface of the sliding housing to function as a semi-automatic driving source for the sliding movement of the sliding housing,
   wherein the ring shape elastic body exerts a force, when deformed, in a direction from a center of the ring shape towards a periphery of the ring shape,
   wherein the force drives the sliding housing towards a fully extended state if the sliding housing is in a substantially extended state in the transverse or longitudinal direction, and
   wherein the force drives the sliding housing towards a fully retracted state if the sliding housing is in a substantially retracted state in the transverse or longitudinal direction.

20. A semi-automatic sliding device of a sliding-type portable communication terminal comprising a body housing and a sliding housing sliding on the body housing, the sliding device comprising:
   a first member;
   a second member sliding in a diagonal direction of the first member while facing the first member;
   guide means for guiding the movement of the second member in the diagonal direction; and
   a ring shape elastic member having a fixed end rotatably connected at a first opposite end at its circumference to the first member, a movable end rotatably connected at a second opposite end at its circumference to the second member and moved along with the second member by the guide means in the diagonal direction, and a semi-automatic driving source disposed between the fixed end and the movable end for driving the second member, wherein the elastic member exerts a force, when deformed, in a direction from a center of the ring shape towards a periphery of the ring shape, wherein the force drives the second member towards a fully extended state if the second member is in a substantially extended state in the diagonal direction, and wherein the force drives the second member towards a fully retracted state if the second member is in a substantially retracted state in the diagonal direction.

21. A semi-automatic sliding device of a sliding-type portable communication terminal comprising a body housing and a sliding housing sliding on the body housing, the sliding device comprising:

a first member;

a second member sliding along a curved guide slot while facing the first member;

guide means for guiding the movement direction of the second member; and a ring shape elastic body having a fixed end rotatably connected at a first opposite end at its circumference to the first member, a movable end rotatably connected at a second opposite end at its circumference to the second member and moved together with the second member by the guide means along the curved guide slot, and the elastic body disposed between the fixed end and the movable end and functioning as a semi-automatic driving source for driving the second member, wherein the ring shape elastic body exerts a force, when deformed, in a direction from a center of the ring shape towards a periphery of the ring shape, wherein the force drives the second member towards a fully extended state if the second member is in a substantially extended state with respect to the curved guide slot, and wherein the force drives the second member towards a fully retracted state if the second member is in a substantially retracted state with respect to the curved guide slot.

22. The semi-automatic sliding device as claimed in claim 21, wherein the guide means comprises a curved slot which is curved in a direction of approaching or departing away from the fixed end.

* * * * *